(12) United States Patent
Zhang et al.

(10) Patent No.: US 12,542,845 B2
(45) Date of Patent: Feb. 3, 2026

(54) DUAL-DISPLAY ELECTRONIC DEVICE OPERATION DURING INCOMING CALL

(71) Applicant: Huawei Technologies Co., Ltd., Shenzhen (CN)

(72) Inventors: Yuxi Zhang, Shanghai (CN); Xiaoxiao Chen, Nanjing (CN); Xiang Han, Shenzhen (CN); Aihua Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 299 days.

(21) Appl. No.: 18/312,320

(22) Filed: May 4, 2023

(65) Prior Publication Data
US 2023/0275985 A1 Aug. 31, 2023

Related U.S. Application Data

(63) Continuation of application No. 17/058,804, filed as application No. PCT/CN2018/103662 on Aug. 31, 2018, now Pat. No. 11,811,961.

(30) Foreign Application Priority Data

May 28, 2018 (WO) ................ PCT/CN2018/088677
Jun. 26, 2018 (WO) ................ PCT/CN2018/092873

(51) Int. Cl.
*H04M 1/72403* (2021.01)
*G06F 3/14* (2006.01)
(Continued)

(52) U.S. Cl.
CPC ...... *H04M 1/72403* (2021.01); *G06F 3/1423* (2013.01); *G06V 10/10* (2022.01);
(Continued)

(58) Field of Classification Search
CPC .. H04M 1/724; H04M 1/72403; H04N 23/63; H04N 23/90; H04N 23/632; H04N 23/57;
(Continued)

(56) References Cited

U.S. PATENT DOCUMENTS

2010/0048194 A1 2/2010 Park et al.
2012/0083319 A1 4/2012 Sirpal et al.
(Continued)

FOREIGN PATENT DOCUMENTS

CN 103037083 A 4/2013
CN 103370924 A 10/2013
(Continued)

*Primary Examiner* — Tuan H Nguyen
(74) *Attorney, Agent, or Firm* — Conley Rose, P.C.

(57) ABSTRACT

A method includes displaying, by an electronic device, a first screen on a second touchscreen in response to receiving an incoming call, where an incoming call number, a first control, and a second control are displayed on the first screen. When the first control is triggered, the electronic device establishes a call with an electronic device corresponding to the incoming call number, or when the second control is triggered, the electronic device refuses to establish a call with an electronic device corresponding to the incoming call number; and displaying prompt information on the second touchscreen, where the prompt information is used to prompt a user to answer the incoming call by using the earpiece on the first screen.

20 Claims, 27 Drawing Sheets

(51) Int. Cl.
*G06V 10/10* (2022.01)
*H04M 1/724* (2021.01)
*H04N 23/57* (2023.01)
*H04N 23/63* (2023.01)
*H04N 23/90* (2023.01)
*H04W 76/10* (2018.01)
*H04M 1/72454* (2021.01)
*H04M 1/72469* (2021.01)

(52) U.S. Cl.
CPC ............ *H04M 1/724* (2021.01); *H04N 23/57* (2023.01); *H04N 23/632* (2023.01); *H04N 23/633* (2023.01); *H04N 23/90* (2023.01); *H04W 76/10* (2018.02); *H04M 1/72454* (2021.01); *H04M 1/72469* (2021.01); *H04M 2250/16* (2013.01)

(58) Field of Classification Search
CPC ... H04N 23/633; H04W 76/10; G06F 3/1423; G06F 3/14; G06V 10/10
See application file for complete search history.

(56) References Cited

U.S. PATENT DOCUMENTS

| | | | |
|---|---|---|---|
| 2013/0222635 A1 | 8/2013 | Choi et al. | |
| 2014/0310643 A1 | 10/2014 | Karmanenko et al. | |
| 2016/0041680 A1 | 2/2016 | Chi et al. | |
| 2017/0018258 A1 | 1/2017 | Yeung | |
| 2017/0034446 A1 | 2/2017 | Park et al. | |
| 2018/0288220 A1* | 10/2018 | Yin | H04M 1/72469 |
| 2019/0138200 A1 | 5/2019 | Zhang | |
| 2019/0155562 A1* | 5/2019 | Lee | G06F 1/1626 |

FOREIGN PATENT DOCUMENTS

| | | | |
|---|---|---|---|
| CN | 104270534 A | 1/2015 |
| CN | 104427129 A | 3/2015 |
| CN | 104536559 A | 4/2015 |
| CN | 104539836 A | 4/2015 |
| CN | 104539844 A | 4/2015 |
| CN | 104598186 A | 5/2015 |
| CN | 104717364 A | 6/2015 |
| CN | 104902186 A | 9/2015 |
| CN | 104954553 A | 9/2015 |
| CN | 105120180 A | 12/2015 |
| CN | 105190479 A | 12/2015 |
| CN | 105334916 A | 2/2016 |
| CN | 105338182 A | 2/2016 |
| CN | 205430353 U | 8/2016 |
| CN | 106101309 A | 11/2016 |
| CN | 106168891 A | 11/2016 |
| CN | 106210328 A | 12/2016 |
| CN | 106231087 A | 12/2016 |
| CN | 106453962 A | 2/2017 |
| CN | 106488008 A | 3/2017 |
| CN | 106534695 A | 3/2017 |
| CN | 106603921 A | 4/2017 |
| CN | 206136005 U | 4/2017 |
| CN | 106657460 A | 5/2017 |
| CN | 106657667 A | 5/2017 |
| CN | 106843786 A | 6/2017 |
| CN | 106953990 A | 7/2017 |
| CN | 107025006 A | 8/2017 |
| CN | 107045421 A | 8/2017 |
| CN | 107102733 A | 8/2017 |
| CN | 107223234 A | 9/2017 |
| CN | 206542462 U | 10/2017 |
| CN | 107517349 A | 12/2017 |
| CN | 107623785 A | 1/2018 |
| CN | 107807772 A | 3/2018 |
| CN | 107820016 A | 3/2018 |
| CN | 107992360 A | 5/2018 |
| CN | 107995973 A | 5/2018 |
| CN | 108063864 A | 5/2018 |
| CN | 108200229 A | 6/2018 |
| JP | 2004187182 A | 7/2004 |
| JP | 2015043602 A | 3/2015 |
| KR | 20160087969 A | 7/2016 |
| WO | 2017113821 A1 | 7/2017 |

* cited by examiner

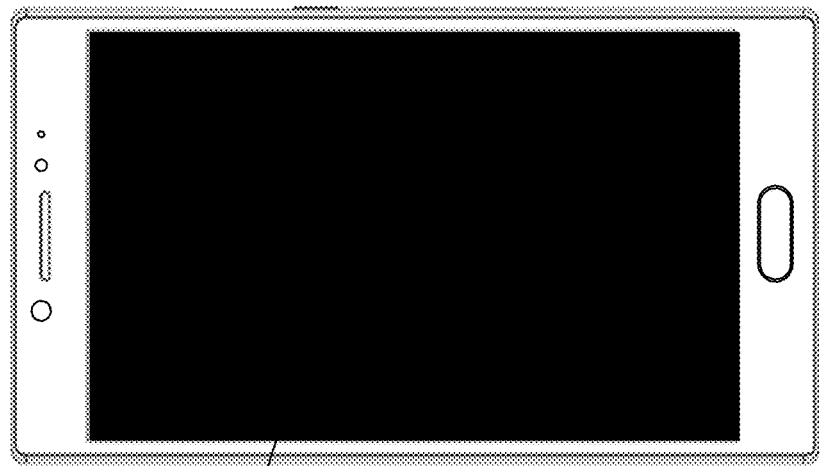
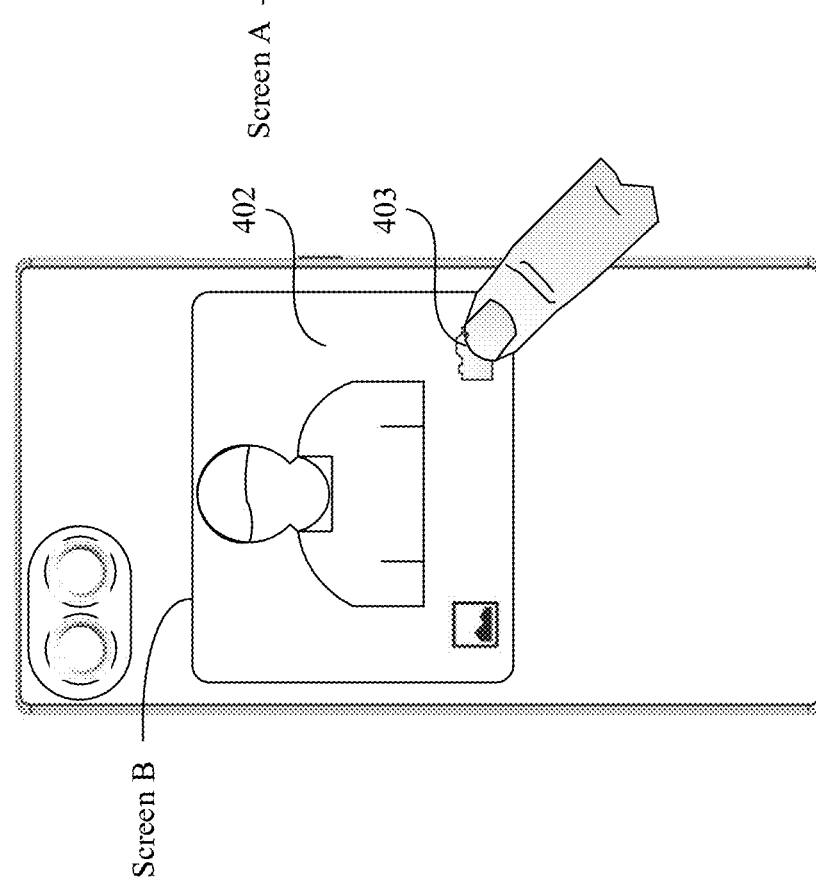
FIG. 4(b)

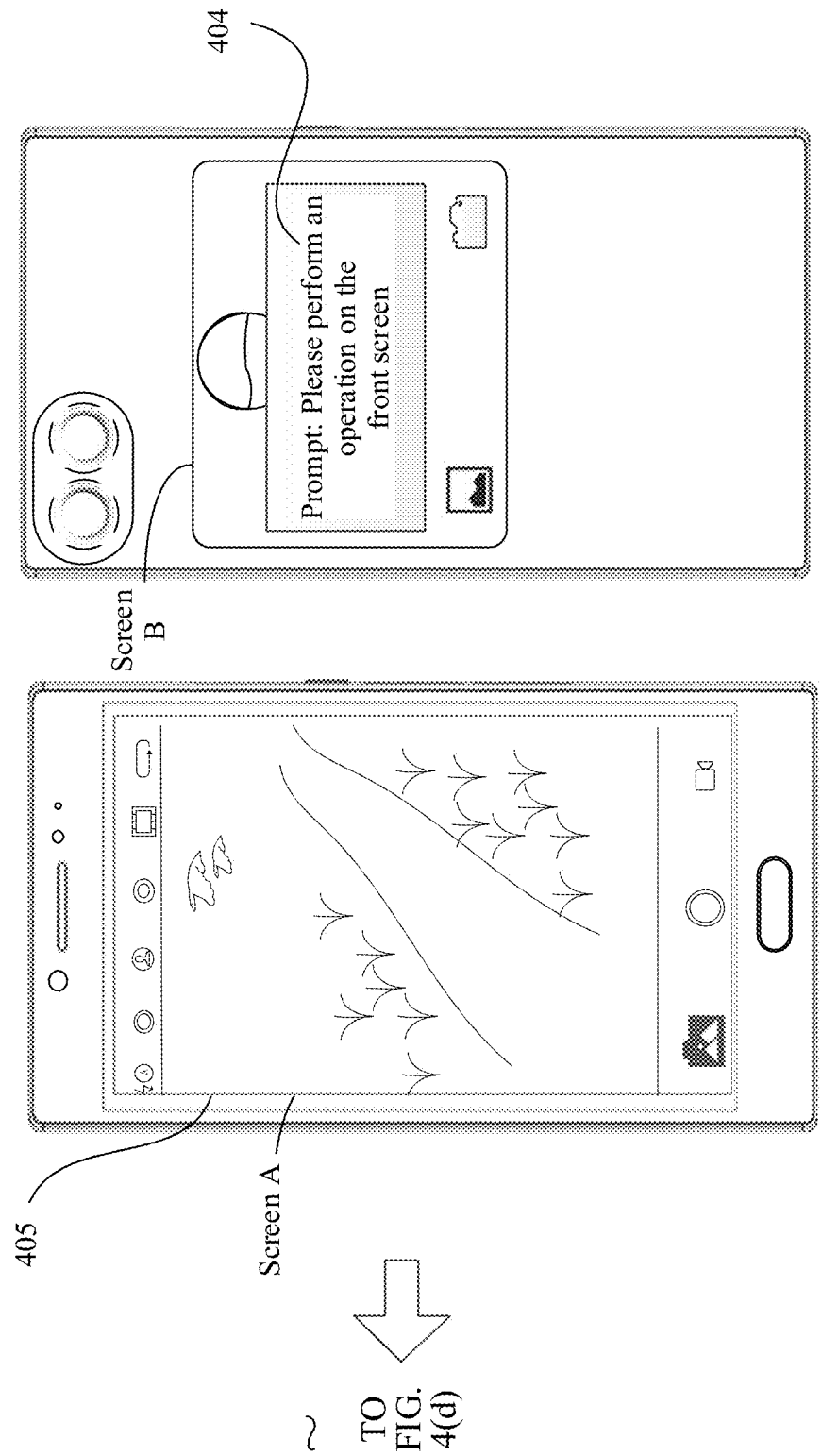

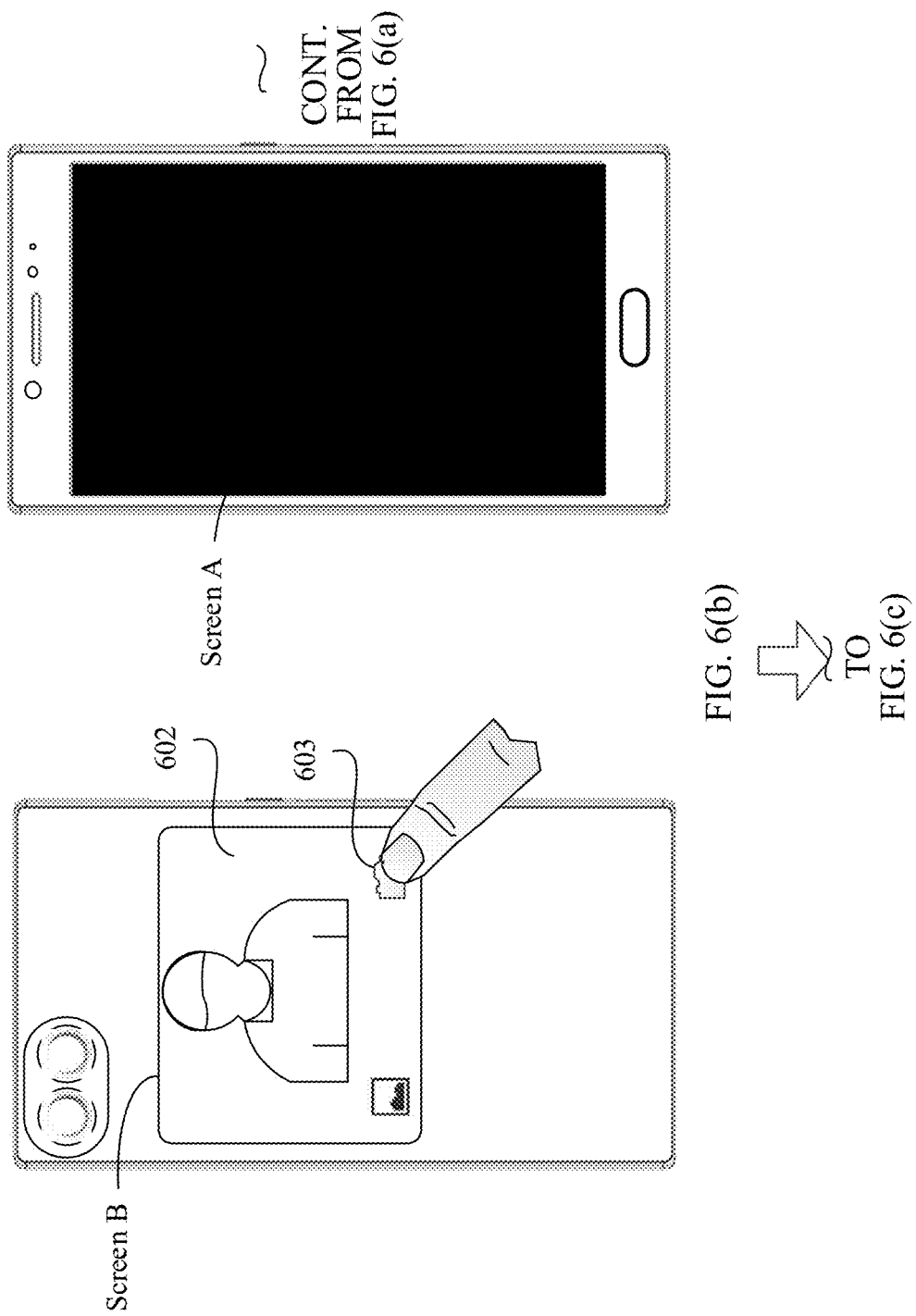

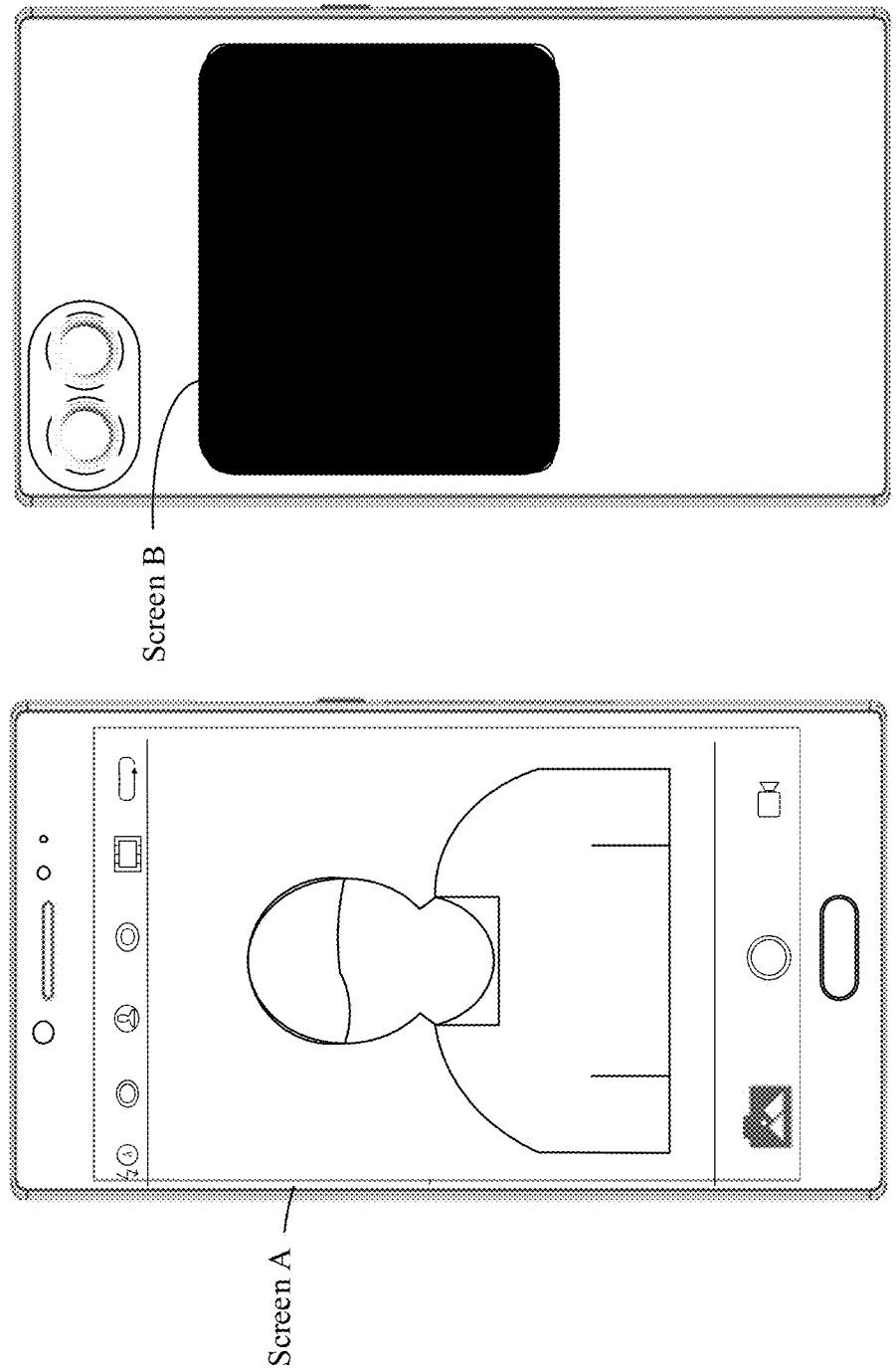

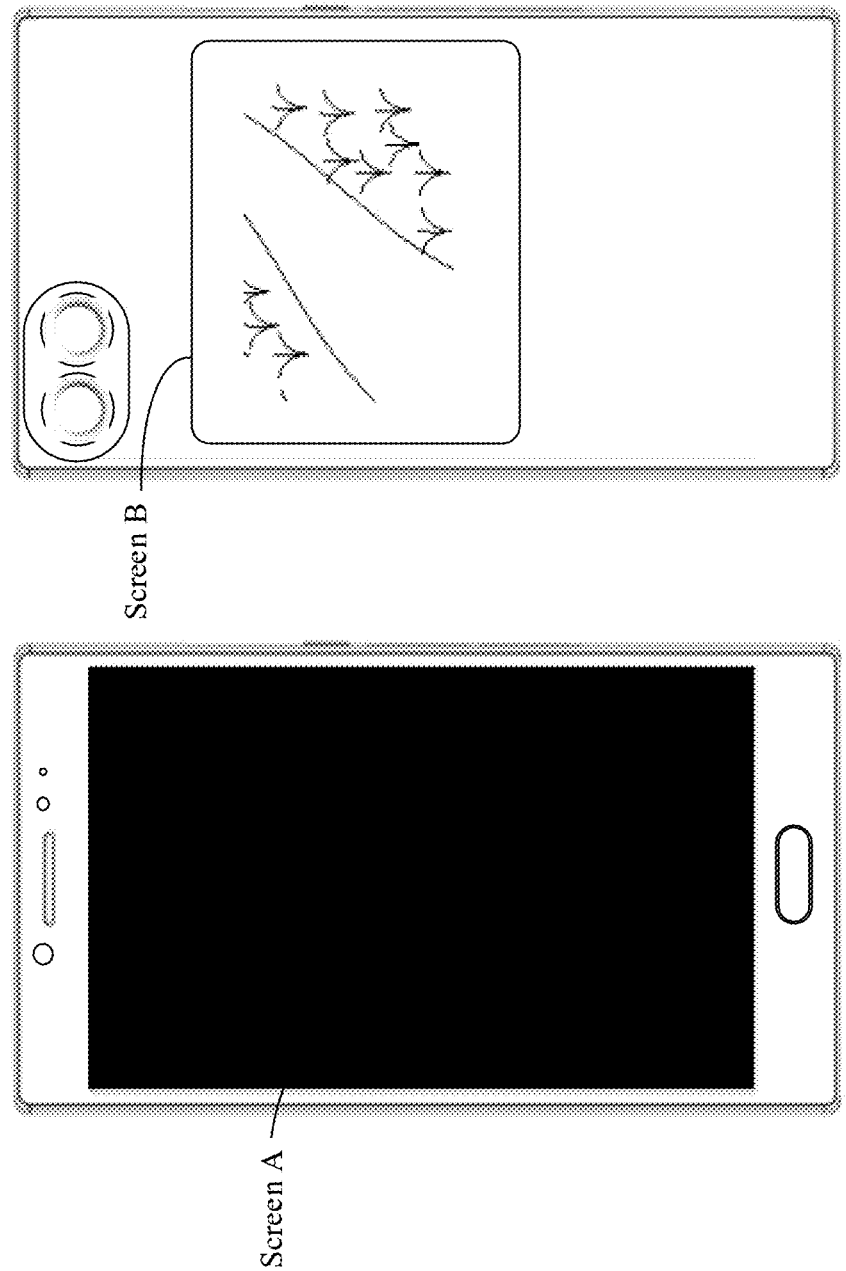

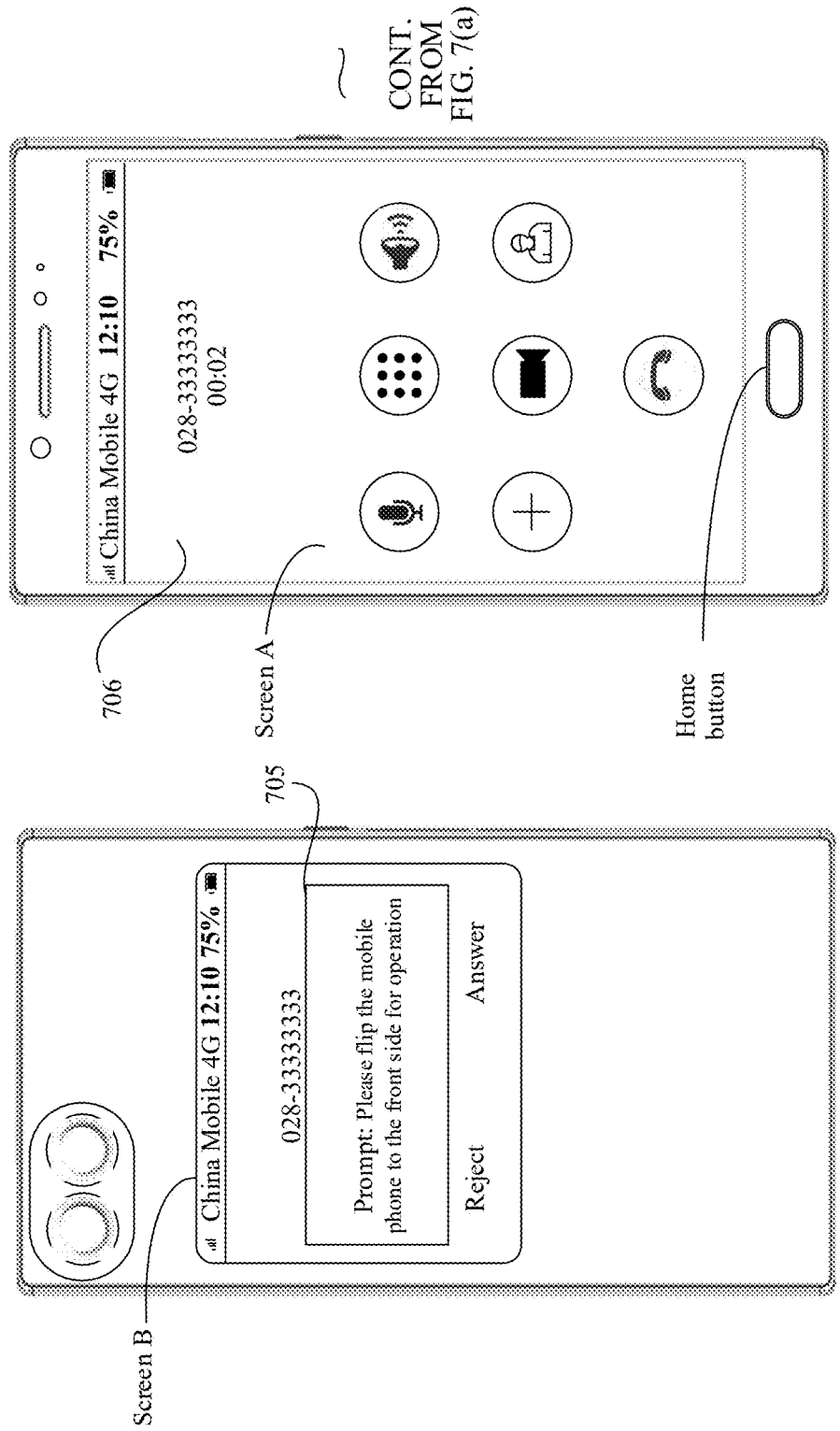

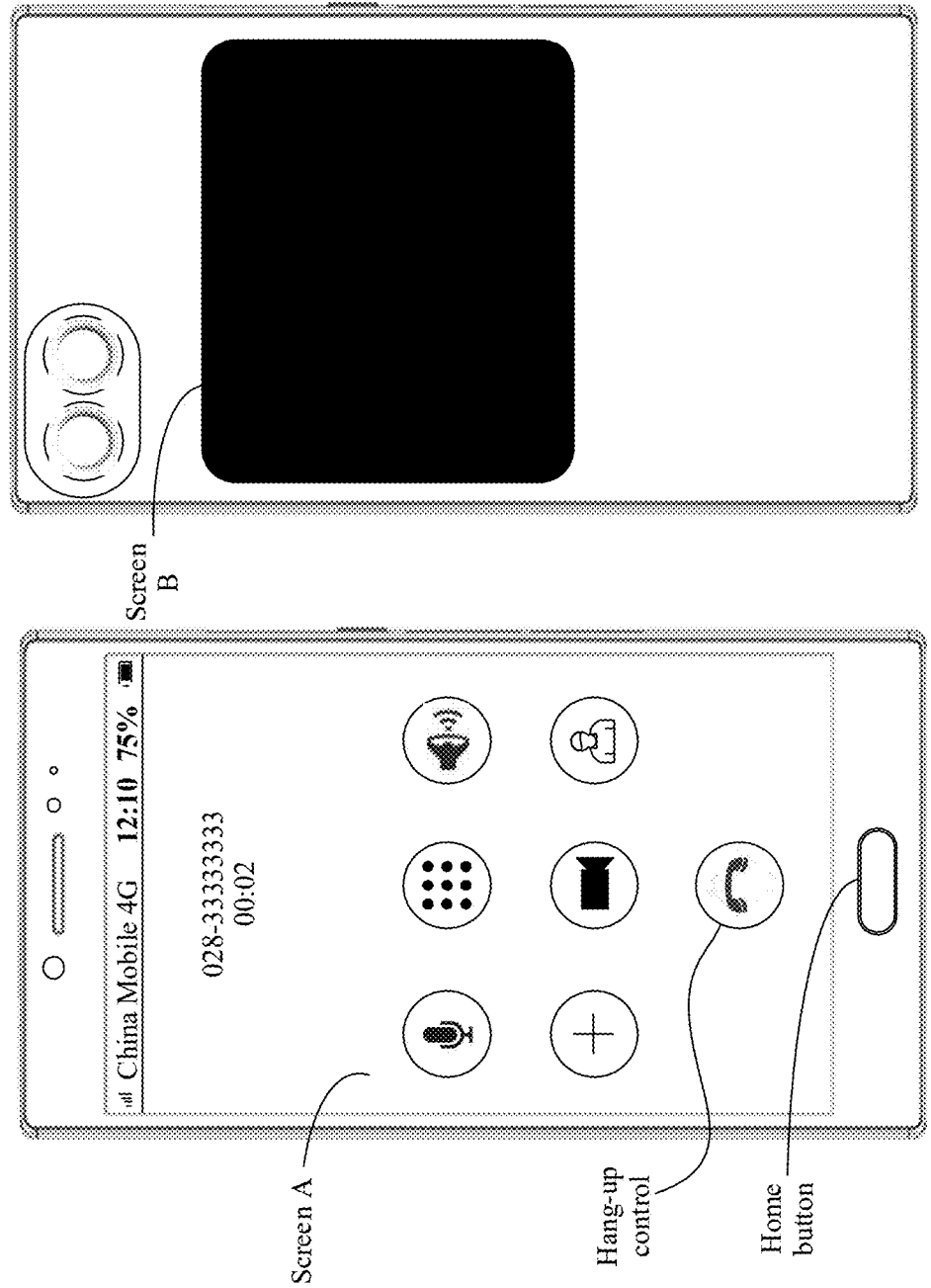

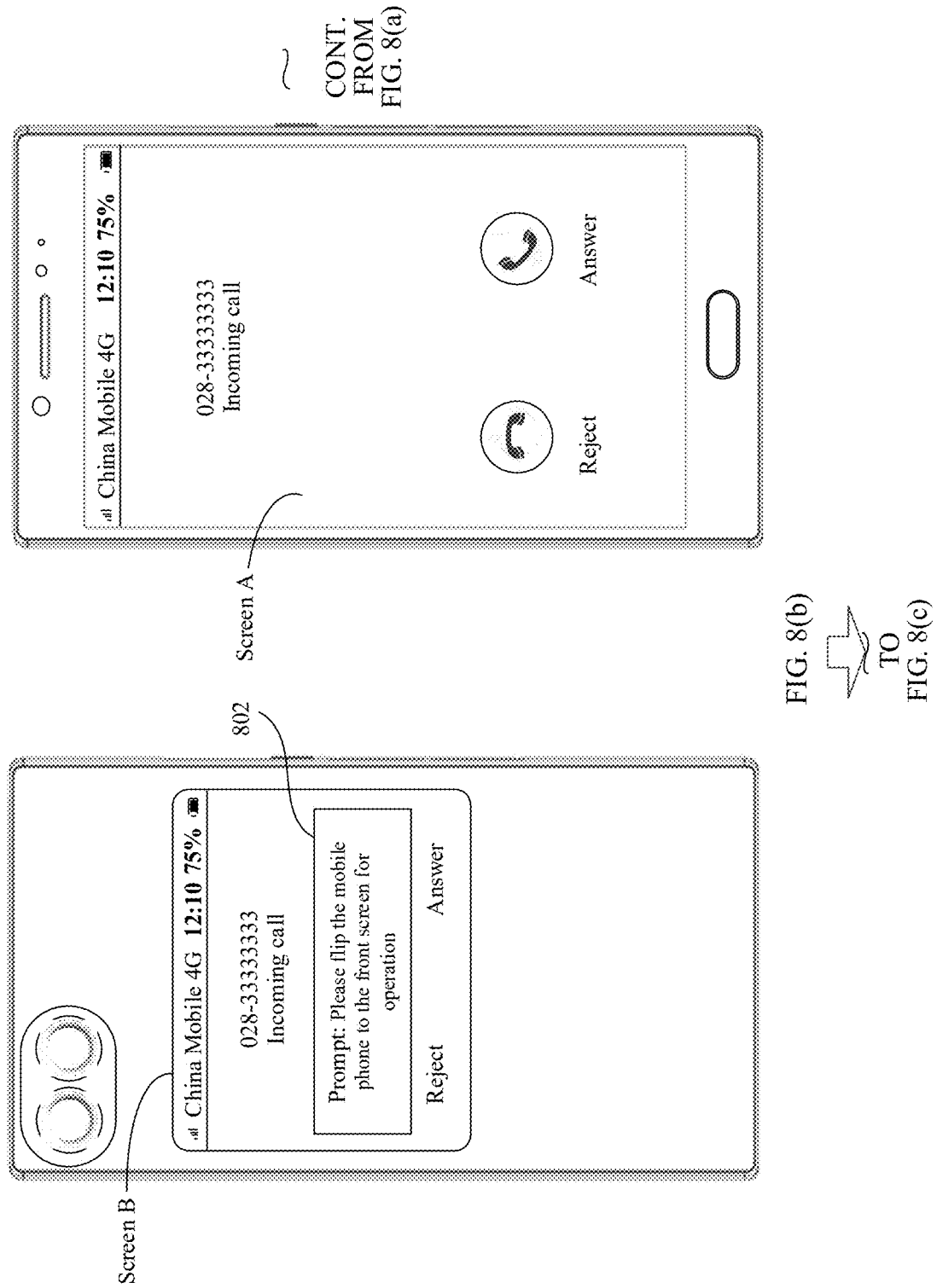

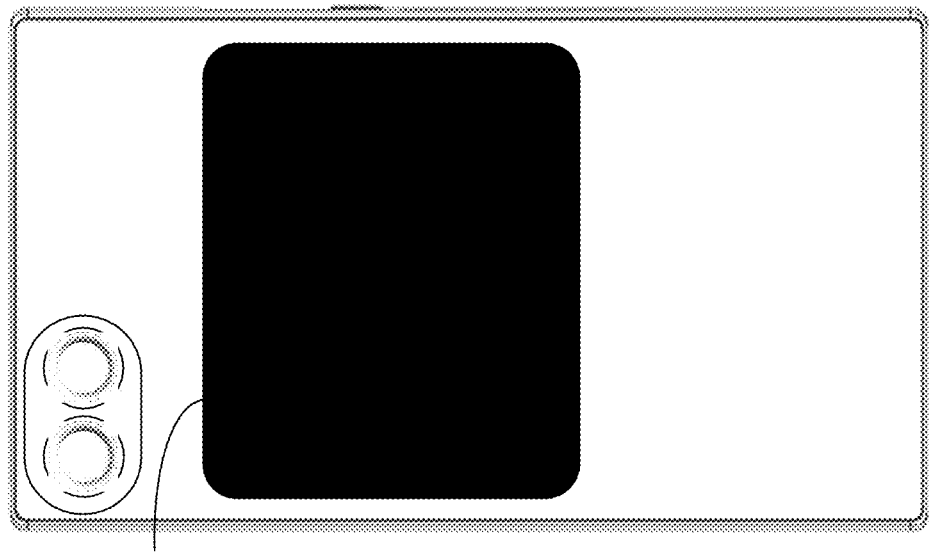
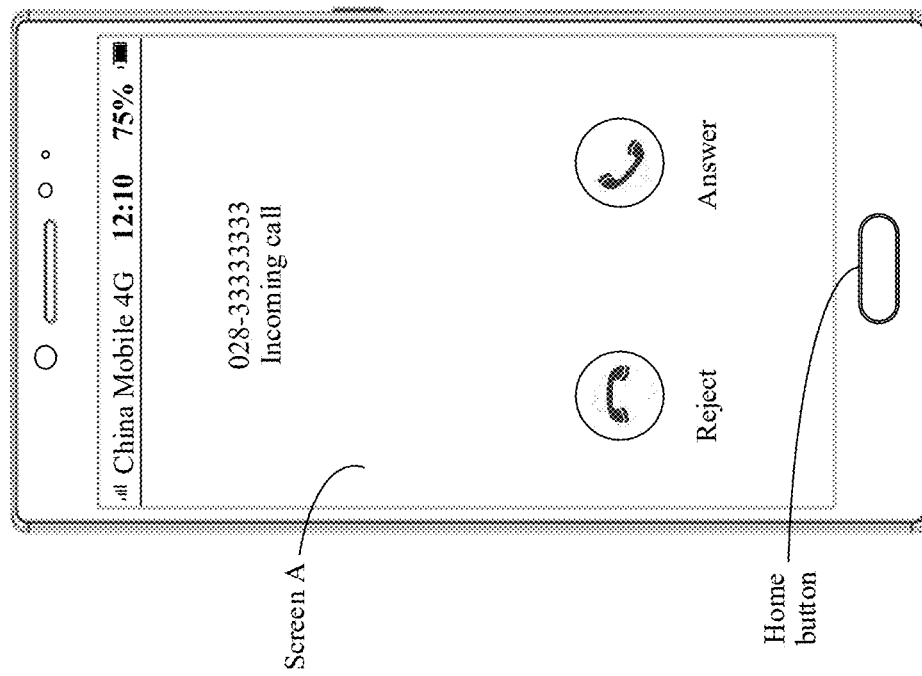
FIG. 8(c)

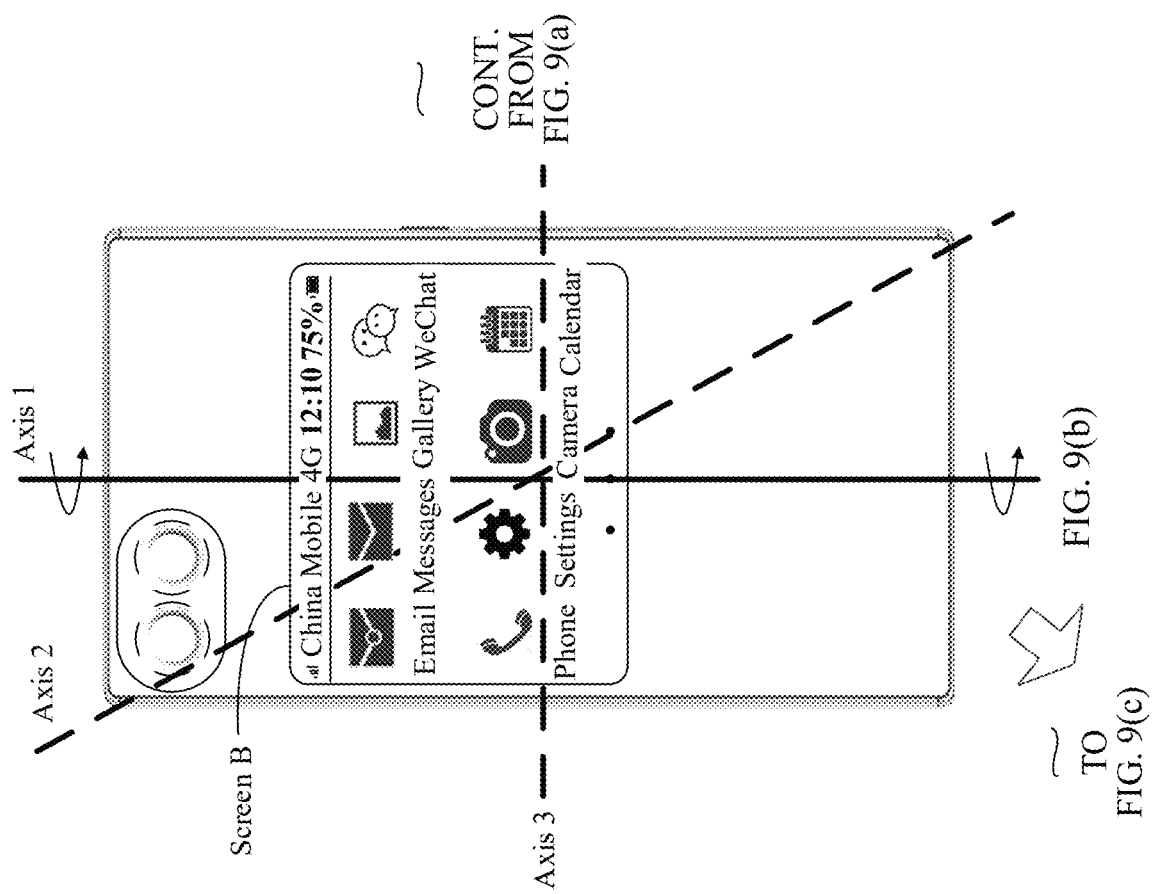

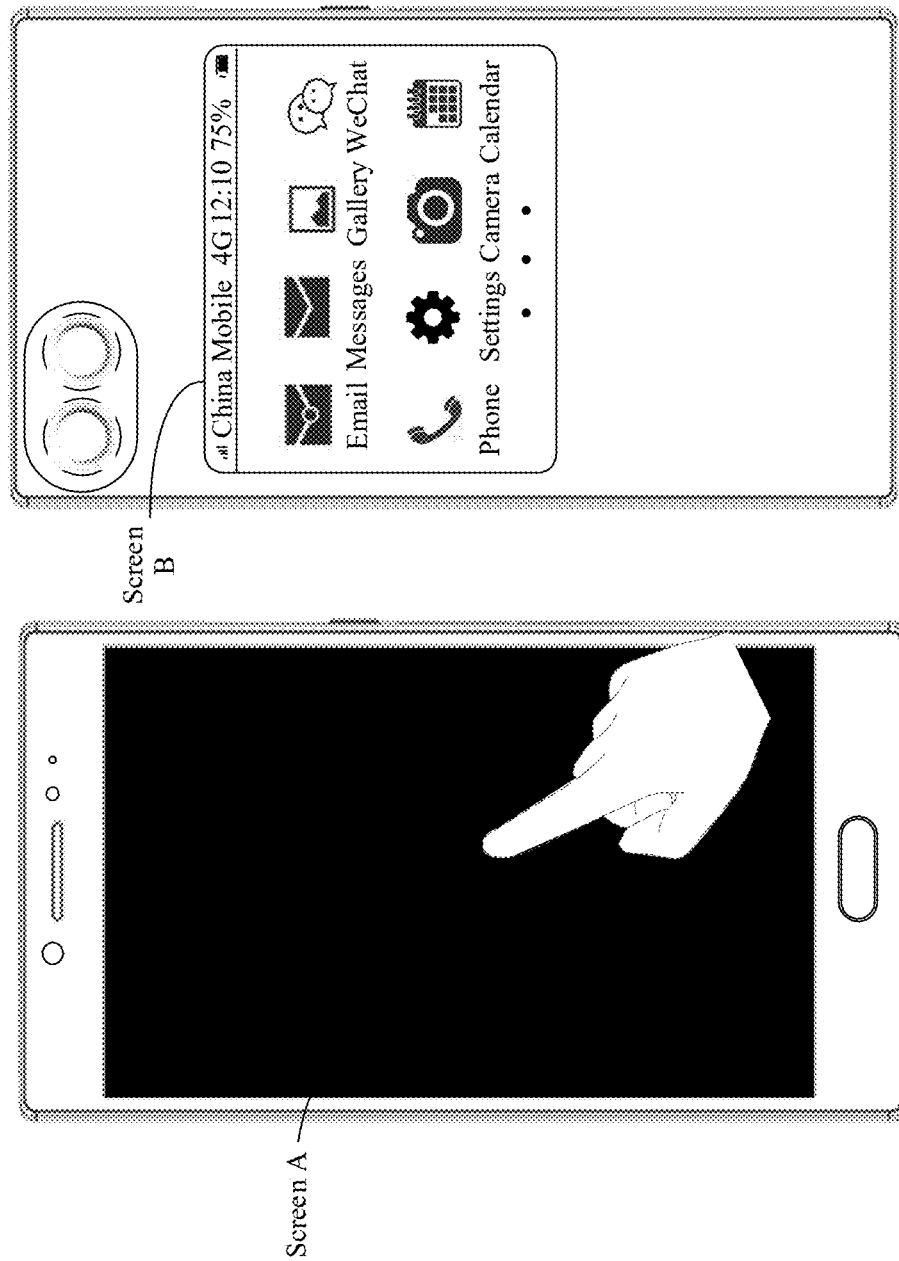
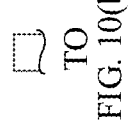
FIG. 10(a)
TO
FIG. 10(b)

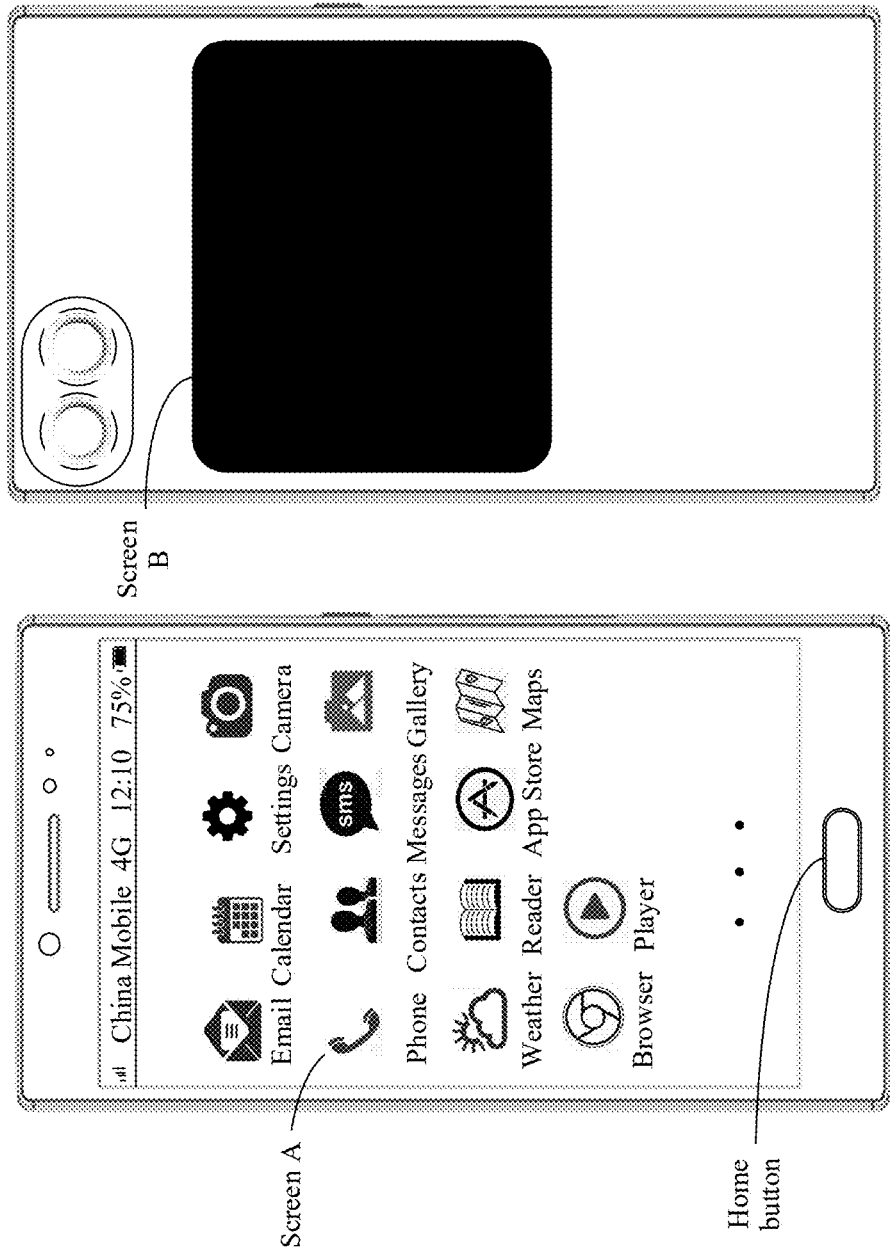

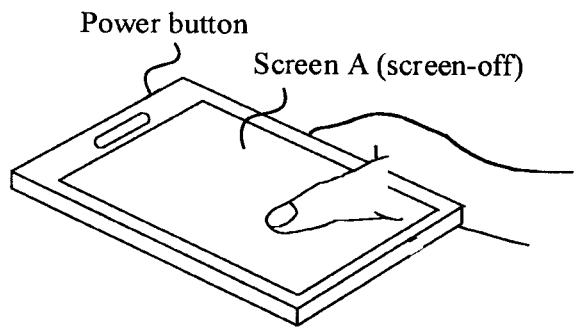

FIG. 11

| |
|---|
| Display a first screen on a second touchscreen in response to receiving an incoming call, where an incoming call number, a first control, and a second control are displayed on the first screen, and when the first control is triggered, an electronic device establishes a call with an electronic device corresponding to the incoming call number, or when the second control is triggered, the electronic device refuses to establish a call with the electronic device corresponding to the incoming call number |

1201

| |
|---|
| Display prompt information on the second touchscreen, where the prompt information is used to prompt a user to answer the incoming call by using an earpiece on a first surface |

DUAL-DISPLAY ELECTRONIC DEVICE OPERATION DURING INCOMING CALL

CROSS-REFERENCE TO RELATED APPLICATIONS

This is a continuation of U.S. patent application Ser. No. 17/058,804 filed on Nov. 25, 2020, which is a U.S. National Stage of International Patent Application No. PCT/CN2018/103662 filed on Aug. 31, 2018, which claims priority to International Patent Application No. PCT/CN2018/092873 filed on Jun. 26, 2018 and International Patent Application No. PCT/CN2018/088677 filed on May 28, 2018. All of the aforementioned patent applications are hereby incorporated by reference in their entireties.

TECHNICAL FIELD

This application relates to the field of terminal technologies, and in particular, to an electronic device operation method and an electronic device.

BACKGROUND

As science and technology develop, an electronic device has increasingly more functions. A mobile phone is used as an example. Currently, the mobile phone may be provided with dual display screens. For example, a screen A is disposed on a front side of the mobile phone, and a screen B is disposed on a rear side of the mobile phone. Currently, when a user operates the dual-screen mobile phone, if the user needs to perform an operation on the screen A, the user may manually turn on the screen A (for example, tap a home button); and when the user needs to perform an operation on the screen B, the user needs to tap a specific button on the screen A to turn on the screen B. It can be learned that when the user operates the dual-screen mobile phone, operations are relatively complex, and interaction between the user and the electronic device is reduced.

SUMMARY

This application provides an electronic device operation method and an electronic device, to help improve interaction between a user and the electronic device to some extent, and improve user experience.

According to a first aspect, an embodiment of this application provides an electronic device operation method, applied to an electronic device. The electronic device includes a first touchscreen and a second touchscreen, the first touchscreen and an earpiece are located on a first surface of the electronic device, the second touchscreen is located on a second surface of the electronic device, and the first surface is different from the second surface. The method includes: displaying a first screen on the second touchscreen in response to receiving an incoming call, where an incoming call number, a first control, and a second control are displayed on the first screen, and when the first control is triggered, the electronic device establishes a call with an electronic device corresponding to the incoming call number, or when the second control is triggered, the electronic device refuses to establish a call with an electronic device corresponding to the incoming call number; and displaying prompt information on the second touchscreen, where the prompt information is used to prompt a user to answer the incoming call by using the earpiece on the first surface.

In this embodiment of this application, the earpiece is disposed on the first surface of the electronic device, and when the electronic device receives the incoming call, an incoming call screen is displayed on the second touchscreen on the second surface. A mobile phone may prompt the user to answer the incoming call by using the earpiece on the first surface. In this manner, the user can be instructed to operate the electronic device to some extent, helping improve user experience.

In a possible design, the electronic device detects a first operation of the user on the first control, and displays the prompt information on the second touchscreen in response to the first operation.

In this embodiment of this application, the earpiece is disposed on the first surface of the electronic device, and when the electronic device receives the incoming call, an incoming call screen is displayed on the second touchscreen on the second surface. When detecting that the user triggers an answer control on the incoming call screen, the electronic device prompts the user to answer the incoming call by using the earpiece on the first surface. In this manner, the user can be instructed to operate the electronic device to some extent, helping improve user experience.

In a possible design, before the first operation of the user on the first control is detected, the first touchscreen is in a screen-off state, and the method further includes: turning on the first touchscreen in response to the first operation of the user on the first control, or turning on the first touchscreen in response to displaying the prompt information on the second touchscreen; and displaying a second screen on the first touchscreen, where the incoming call number and call duration are displayed on the second screen.

According to the foregoing technical solution, the user can be instructed to operate the electronic device to some extent, and the user does not need to manually turn on the first touchscreen. This facilitates a user operation and helps improve user experience.

In a possible design, a touch function of the first touchscreen is disabled within a first preset time after the second screen is displayed on the first touchscreen, and the touch function of the first touchscreen is enabled when it is detected that the electronic device is flipped and the first touchscreen faces the user.

In this embodiment of this application, after turning on the first touchscreen and displaying the second screen on the first touchscreen, the electronic device may disable the touch function of the first touchscreen, to prevent the user from accidentally touching the first touchscreen in a process of flipping the electronic device. After the user flips the electronic device and the first touchscreen faces the user, the electronic device enables the touch function of the first touchscreen. In this manner, a user operation is facilitated, and user experience is improved.

In a possible design, a touch function of the second touchscreen is disabled within a second preset time after the prompt information is displayed on the second touchscreen.

In this embodiment of this application, the touchscreen function of the second touchscreen is disabled within the period of time after the prompt information is displayed on the second touchscreen, to prevent the user from accidentally touching the first touchscreen in a process of flipping the electronic device. In this manner, a user operation is facilitated, and user experience is improved.

In a possible design, the second touchscreen is turned off beyond the second preset time after the prompt information is displayed on the second touchscreen; the second touchscreen is turned off in response to turning on the first touchscreen; or the second touchscreen is turned off in response to detecting that the electronic device is flipped and the first touchscreen faces the user.

The foregoing technical solution helps reduce power consumption of the electronic device.

In a possible design, the first touchscreen is in a screen-off state, and the method further includes: turning on the first touchscreen in response to displaying the prompt information on the second touchscreen; and displaying the first screen on the first touchscreen.

According to the foregoing technical solution, the user can be instructed to operate the electronic device to some extent, and the user does not need to manually turn on the first touchscreen. This facilitates a user operation and helps improve user experience.

In a possible design, the electronic device turns off the first touchscreen in response to a second operation of the user on the second control on the second touchscreen.

The foregoing technical solution helps reduce power consumption of the electronic device.

According to a second aspect, an embodiment of this application provides an electronic device operation method, applied to an electronic device. The electronic device includes a first touchscreen, a second touchscreen, a first camera, and a second camera, the first touchscreen and the first camera are located on a first surface of the electronic device, the second camera and the second touchscreen are located on a second surface of the electronic device, and the first surface is different from the second surface. The method includes: displaying a home screen on the second touchscreen, where the home screen includes a camera icon; detecting a first operation of a user on the camera icon; displaying a first screen on the second touchscreen in response to the first operation, where the first screen includes a first preview box, and an image collected by the second camera is displayed in the first preview box; detecting a second operation of the user on a first control on the first screen; enabling the first camera in response to the second operation; and displaying prompt information on the second touchscreen, where the prompt information is used to prompt the user to perform an operation on the first screen.

According to the foregoing technical solution, the user can be instructed to operate the electronic device to some extent, helping improve user experience.

In a possible design, before the detecting a second operation, the first touchscreen is in a screen-off state, and the method further includes: turning on the first touchscreen in response to the second operation, or turning on the first touchscreen in response to output of the prompt information; and displaying a second screen on the first touchscreen, where the second screen includes a second preview box, and an image collected by the first camera is displayed in the second preview box.

In this embodiment of this application, the user can be instructed to operate the electronic device to some extent, and the user does not need to manually turn on the first touchscreen. This facilitates a user operation and helps improve user experience.

In a possible design, a touch function of the first touchscreen is disabled within a first preset time after the second screen is displayed on the first touchscreen, and the touch function of the first touchscreen is enabled when it is detected that the electronic device is flipped and the first touchscreen faces the user.

In this embodiment of this application, after turning on the first touchscreen, the electronic device may disable the touch function of the first touchscreen, to prevent the user from accidentally touching the first touchscreen in a process of flipping the electronic device. After the user flips the electronic device and the first touchscreen faces the user, the electronic device enables the touch function of the first touchscreen. In this manner, a user operation is facilitated, and user experience is improved.

In a possible design, a touch function of the second touchscreen is disabled within a second preset time after the prompt information is displayed on the second touchscreen.

In this embodiment of this application, the touchscreen function of the second touchscreen is disabled within the period of time after the prompt information is displayed on the second touchscreen, to prevent the user from accidentally touching the first touchscreen in a process of flipping the electronic device. In this manner, a user operation is facilitated, and user experience is improved.

In a possible design, the second touchscreen is turned off beyond the second preset time after the prompt information is displayed on the second touchscreen; the second touchscreen is turned off in response to turning on the first touchscreen; or the second touchscreen is turned off in response to detecting that the electronic device is flipped and the first touchscreen faces the user.

The foregoing technical solution helps reduce power consumption of the electronic device.

In a possible design, before the displaying prompt information on the second touchscreen, the method further includes: displaying a prompt box on the second touchscreen, where the prompt box includes the first control and a second control, and when the first control is triggered, the image collected by the first camera is determined to be displayed on the first touchscreen, or when the second control is triggered, the image collected by the first camera is determined to be displayed on the second touchscreen; and the displaying prompt information on the second touchscreen, includes: displaying the prompt information on the second touchscreen in response to the first operation of the user on the first control.

In this embodiment of this application, when the user starts a camera application on the second touchscreen of the electronic device, a preview box is displayed on the second touchscreen. If the user triggers a camera switching control in the preview box, a front-facing camera is enabled, and the prompt box is displayed on the second touchscreen, where the prompt box includes the two controls. If the user selects one of the controls, the electronic device displays, on the second touchscreen, an image collected by the front-facing camera. If the user triggers the other control, the electronic device displays the prompt information, to prompt the user to perform an operation on a surface on which the first touchscreen is located. In this manner, the user can be instructed to operate the electronic device to some extent, helping improve user experience.

According to a third aspect, an embodiment of this application provides an electronic device. The electronic device includes a processor and a memory. The memory is configured to store one or more computer programs. When the one or more computer programs stored in the memory are executed by the processor, the electronic device is enabled to implement the technical solution according to any one of the first aspect or the possible designs of the first aspect of the embodiments of this application. Alternatively, when the one or more computer programs stored in the memory are executed by the processor, the electronic device is enabled to implement the technical solution according to any one of the second aspect or the possible designs of the second aspect of the embodiments of this application.

According to a fourth aspect, an embodiment of this application provides a chip. The chip is coupled to a memory in an electronic device, to perform the technical solution according to any one of the first aspect or the possible designs of the first aspect of the embodiments of this application. Alternatively, the chip is coupled to a memory in an electronic device, to perform the technical solution according to any one of the second aspect or the possible designs of the second aspect of the embodiments of this application. "Coupling" in the embodiments of this application means that two components are directly or indirectly combined with each other.

According to a fifth aspect, an embodiment of this application provides a computer storage medium, where the computer-readable storage medium includes a computer program. When the computer program runs on an electronic device, the electronic device is enabled to perform the technical solution according to any one of the first aspect or the possible designs of the first aspect of the embodiments of this application. Alternatively, when the computer program runs on an electronic device, the electronic device is enabled to perform the technical solution according to any one of the second aspect or the possible designs of the second aspect of the embodiments of this application.

According to a sixth aspect, an embodiment of this application provides a computer program product. When the computer program product runs on an electronic device, the electronic device is enabled to perform the technical solution according to any one of the first aspect or the possible designs of the first aspect of the embodiments of this application. Alternatively, when the computer program product runs on an electronic device, the electronic device is enabled to perform the technical solution according to any one of the second aspect or the possible designs of the second aspect of the embodiments of this application.

BRIEF DESCRIPTION OF DRAWINGS

FIG. 4(a) to FIG. 4(d) are schematic diagrams of graphical user interfaces on display screens of a mobile phone according to an embodiment of the present invention;

FIG. 6(a) to FIG. 6(f) are schematic diagrams of graphical user interfaces on display screens of a mobile phone according to an embodiment of the present invention;

FIG. 7(a) to FIG. 7(c) are schematic diagrams of graphical user interfaces on display screens of a mobile phone according to an embodiment of the present invention;

FIG. 8(a) to FIG. 8(c) are schematic diagrams of graphical user interfaces on display screens of a mobile phone according to an embodiment of the present invention;

FIG. 9(a) to FIG. 9(c) are schematic diagrams of graphical user interfaces on display screens of a mobile phone according to an embodiment of the present invention;

FIG. 10(a) and FIG. 10(b) are schematic diagrams of graphical user interfaces on display screens of a mobile phone according to an embodiment of the present invention;

FIG. 11 is a schematic diagram of holding a mobile phone by a user according to an embodiment of the present invention;

FIG. 12 is a schematic flowchart of an electronic device operation method according to an embodiment of the present invention;

DESCRIPTION OF EMBODIMENTS

The following describes the technical solutions in the embodiments of this application with reference to the accompanying drawings in the embodiments of this application.

The following describes an electronic device, a graphical user interface (graphical user interface, GUI) used for such an electronic device, and embodiments in which such an electronic device is used. In some embodiments of this application, the electronic device may be a portable electronic device, such as a mobile phone, a tablet computer, or a wearable device (for example, a smartwatch) with a wireless communication function, that includes a function such as a personal digital assistant and/or a music player. An example embodiment of the portable electronic device includes but is not limited to a portable electronic device using iOS®, Android®, Microsoft®, or another operating system. Alternatively, the portable electronic device may be another portable electronic device, for example, a laptop computer (laptop) with a touch-sensitive surface (for example, a touch panel). It should be further understood that, in some other embodiments of this application, the electronic device may not be the portable electronic device, but a desktop computer with a touch-sensitive surface (for example, a touch panel).

Generally, the electronic device supports a plurality of applications, for example, one or more of a drawing application, a presentation application, a word processing application, a game application, a phone application, a video player application, a music player application, an email application, an instant message receiving and sending application, a photo management application, a camera application, a browser application, a calendar application, a clock application, a payment application, and a health management application.

The following provides specific description by using an example in which the electronic device is a mobile phone having a front-facing camera and a rear-facing camera.

Figure 1:
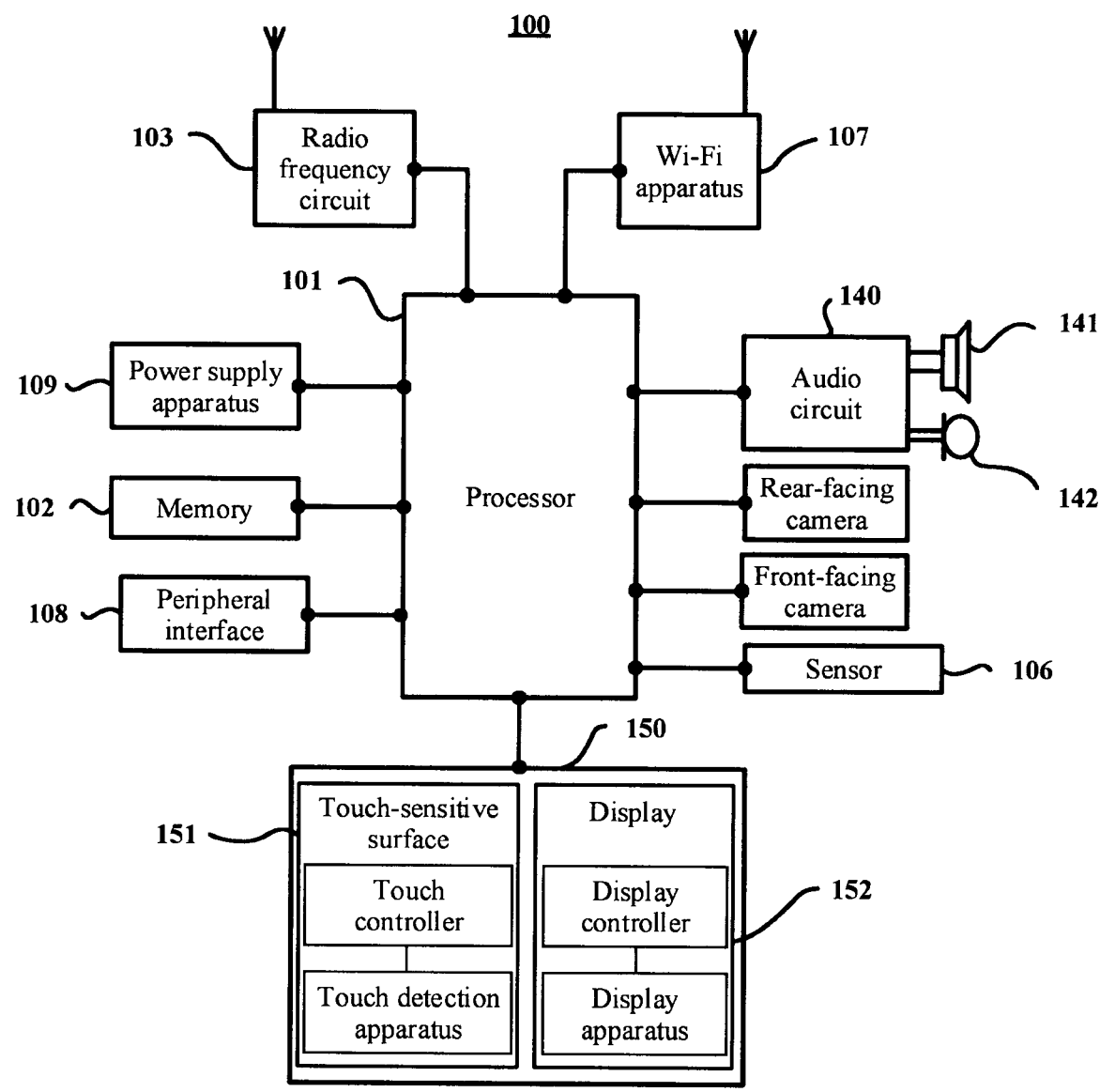
FIG. 1 is a schematic structural diagram of a mobile phone according to an embodiment of the present invention.

For example, FIG. 1 is a possible schematic structural diagram of a mobile phone having a front-facing camera and a rear-facing camera. It should be understood that the mobile phone 100 shown in the figure is merely an example of an electronic device, and the mobile phone 100 may have more or fewer components than those shown in the figure, may combine two or more components, or may have different component configurations. Various components shown in the figure may be implemented in hardware that includes one or more signal processing and/or application-specific integrated circuits, software, or a combination of hardware and software.

In addition to the front-facing camera and the rear-facing camera, the mobile phone 100 may further include one or more processors 101, a memory 102, a radio frequency (radio frequency, RF) circuit 103, an audio circuit 140, a speaker 141, a microphone 142, a touchscreen 150, one or more sensors 106, a wireless fidelity (wireless fidelity, Wi-Fi) apparatus 107, a peripheral interface 108, and a power supply apparatus 109. These components may communicate by using one or more communications buses or signal cables (not shown in FIG. 1). A person skilled in the art may understand that a hardware structure shown in FIG. 1 does not constitute a limitation on the mobile phone 100. The mobile phone 100 may include more or fewer components than those shown in the figure, or combine some components, or have different component arrangements.

The following describes the components of the mobile phone 100 in detail.

The processor 101 is a control center of the mobile phone 100. The processor 101 is connected to parts of the mobile phone 100 by using various interfaces and cables, runs or executes an application program (application, App for short) stored in the memory 102, and invokes data and an instruction stored in the memory 102, to perform various functions of the mobile phone 100 and process data. For example, the processor 101 may automatically control enabling or disabling of the front-facing camera and the rear-facing camera.

In some embodiments, the processor 101 may include one or more processing units. An application processor and a modem processor may be integrated into the processor 101. The application processor mainly processes an operating system, a user interface, an application program, and the like, and the modem processor mainly processes wireless communication. It may be understood that the modem processor may alternatively not be integrated into the processor 101. For example, the processor 101 may be a chip Kirin 970 manufactured by Huawei Technologies Co., Ltd. In some other embodiments of this application, the processor 101 may further include a fingerprint verification chip, configured to verify a collected fingerprint.

The memory 102 is configured to store an application program and data. The memory 102 mainly includes a program storage area and a data storage area. The program storage area may store an operating system and an application program required by at least one function (for example, a sound playing function and an image playing function). The data storage area may store data (such as audio data and a phone book) created based on use of the mobile phone 100. For example, the data storage area may further store a photo taken by a user, a composite picture obtained based on a photo taken by a user, or the like. It should be understood that a photo taken by the user by using the mobile phone 100 or a composite photo obtained based on a photo taken by the user by using the mobile phone 100 may be further stored in a cloud. When receiving an operation of the user for viewing the photo, the mobile phone 100 obtains a corresponding photo from the cloud and displays the photo on the mobile phone 100. In addition, the memory 102 may include a high-speed random access memory, and may further include a non-volatile memory, for example, a magnetic disk storage device, a flash memory, or another non-volatile solid-state storage device. The memory 102 may further store various operating systems such as an iOS® operating system developed by the Apple Inc. and an Android® operating system developed by the Google Inc.

The RF circuit 103 may be configured to receive and send a radio signal in an information receiving and sending process or a call process. Specifically, the RF circuit 103 may receive downlink data of a base station, and then send the downlink data to the processor 101 for processing. In addition, the RF circuit 103 may further send uplink data to the base station. Generally, the RF circuit 103 includes but is not limited to an antenna, at least one amplifier, a transceiver, a coupler, a low noise amplifier, a duplexer, and the like. In addition, the RF circuit 103 may further communicate with another device through wireless communication. Any communications standard or protocol may be used for the wireless communication, including but not limited to the global system for mobile communications, general packet radio service, code division multiple access, wideband code division multiple access, long term evolution, email, SMS message service, and the like.

The audio circuit 140, the speaker 141, and the microphone 142 may provide an audio interface between the user and the mobile phone 100. The audio circuit 140 may convert received audio data into an electrical signal and transmit the electrical signal to the speaker 141, and the speaker 141 converts the electrical signal into a sound signal for output. In addition, the microphone 142 converts a collected sound signal into an electrical signal, and the audio circuit 140 receives the electrical signal, converts the electrical signal into audio data, and then outputs the audio data to the RF circuit 103, to send the audio data to, for example, a mobile phone, or outputs the audio data to the memory 102 for further processing.

The touchscreen 150 may include a touch-sensitive surface 151 and a display 152. The touch-sensitive surface 151 (for example, a touch panel) may collect a touch event performed by the user of the mobile phone 100 on or near the touch-sensitive surface 151 (for example, an operation performed by the user on the touch-sensitive surface 151 or near the touch-sensitive surface 151 by using any suitable object such as a finger or a stylus), and send collected touch information to another component such as the processor 101. The touch event performed by the user near the touch-sensitive surface 151 may be referred to as a floating touch. The floating touch may mean that the user does not need to directly touch the touchpad for selecting, moving, or dragging an object (for example, an App icon), and the user only needs to be near the electronic device to execute a desired function. In an application scenario of the floating touch, terms such as "touch" and "contact" do not imply a direct contact with the touchscreen 150, but a contact near or close to the touchscreen 150. The touch-sensitive surface 151 on which the floating touch can be performed may be implemented in a capacitive type, an infrared light sensing type, an ultrasonic wave type, or the like.

The touch-sensitive surface 151 may include two parts: a touch detection apparatus and a touch controller. The touch detection apparatus detects a touch orientation of the user, detects a signal generated by a touch operation, and transmits the signal to the touch controller. The touch controller receives touch information from the touch detection apparatus, converts the touch information into touchpoint coordinates, and sends the touchpoint coordinates to the processor 101. The touch controller may further receive an instruction sent by the processor 101, and execute the instruction. In addition, the touch-sensitive surface 151 may be implemented in a plurality of types such as a resistive type, a capacitive type, an infrared type, and a surface acoustic wave type.

Figure 2:
FIG. 2 is a schematic diagram of a graphical user interface on a display screen of a mobile phone according to an embodiment of the present invention.

The display (also referred to as a display screen) 152 may be configured to display information entered by the user or information provided for the user, and various graphical user interfaces (graphical user interface, GUI). For example, the display 152 may display a photo, a video, or the like. For another example, the display 152 may display a graphical user interface shown in FIG. 2. The graphical user interface shown in FIG. 2 includes a status bar 201, a hideable navigation bar 202, a time and weather widget (widget) 203, and an application icon, for example, a camera icon 204. The status bar 201 includes an operator name (for example, China Mobile), a mobile network (for example, 4G), time, and remaining power. The navigation bar 202 includes a back (back) button icon, a home (home) button icon, and a forward button icon. In addition, it may be understood that, in some embodiments, the status bar 201 may further include a Bluetooth icon, a Wi-Fi icon, an externally-connected device icon, and the like. It may be further understood that in some other embodiments, the graphical user interface shown in FIG. 2 may further include a dock bar, and the dock bar may include a common application icon and the like. After detecting a touch event of the user on an application icon by using a finger (or a stylus, or the like), the processor 101 starts, in response to the touch event, a user interface of an application corresponding to the application icon, and displays the user interface of the application on the display 152.

It should be understood that, generally, the display 152 may include two parts: a display controller and a display apparatus. The display controller is configured to receive a signal or data sent by the processor 101, to drive to display a corresponding screen on the display apparatus. For example, in this embodiment of this application, the display apparatus may be configured by using an LCD (liquid crystal display, a liquid crystal display), an organic light-emitting diode (organic light-emitting diode, OLED), or the like. For example, the display apparatus is configured by using an active matrix organic light-emitting diode (active matrix organic light emitting diode, AMOLED).

It should be understood that the touch-sensitive surface 151 may cover the display 152. After detecting a touch event on or near the touch-sensitive surface 151, the touch-sensitive surface 151 transmits the touch event to the processor 101 to determine a type of the touch event, and then the processor 101 may provide corresponding visual output on the display 152 based on the type of the touch event. Although in FIG. 1, the touch-sensitive surface 151 and the display 152 are used as two independent components to implement input and output functions of the mobile phone 100, in some embodiments, the touch-sensitive surface 151 and the display 152 may be integrated to implement the input and output functions of the mobile phone 100. It may be understood that the touchscreen 150 is formed by stacking a plurality of layers of materials. In this embodiment of this application, only the touch-sensitive surface (layer) and the display (layer) are shown, and another layer is not described in detail in this embodiment of this application. In addition, in some other embodiments of this application, the touch-sensitive surface 151 may cover the display 152, and a size of the touch-sensitive surface 151 is greater than a size of the display 152, so that the entire display 152 is covered by the touch-sensitive surface 151. Alternatively, the touch-sensitive surface 151 may be disposed on a front of the mobile phone 100 in a form of a full panel, in other words, touch of the user on the front of the mobile phone 100 can be sensed by the mobile phone. Therefore, full touch experience on the front of the mobile phone can be implemented. In some other embodiments, the touch-sensitive surface 151 is disposed on a front of the mobile phone 100 in a full panel form, and the display 152 may also be disposed on the front of the mobile phone 100 in a full panel form. Therefore, a bezel-less structure can be implemented on the front of the mobile phone. In some other embodiments of this application, the touchscreen 150 may further include a series of pressure sensor arrays, so that the mobile phone can sense pressure exerted on the touchscreen 150 by the touch event.

The one or more sensors 106 may be an optical sensor, a motion sensor, another sensor, and the like. Specifically, the optical sensor may include an ambient light sensor and a proximity sensor. The ambient light sensor may adjust luminance of the display of the touchscreen 150 based on intensity of ambient light. The proximity sensor may power off the display when the mobile phone 100 is moved to an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape screen and a vertical screen, a related game, and magnetometer posture calibration), a function related to vibration recognition (such as a pedometer and a knock), and the like. The another sensor, for example, a gyroscope, may be configured to detect an angle of rotation of the mobile phone 100 around a fixed point or an axis.

In some embodiments of this application, the sensor 106 may further include a fingerprint sensor. For example, the fingerprint sensor may be disposed on a rear side of the mobile phone 100 (for example, below the rear-facing camera), or the fingerprint sensor is disposed on the front side of the mobile phone 100 (for example, below the touchscreen 150). In addition, a fingerprint recognition function may be implemented by configuring the fingerprint sensor on the touchscreen 150. To be specific, the fingerprint sensor may be integrated with the touchscreen 150 to implement the fingerprint recognition function of the mobile phone 100. In this case, the fingerprint sensor may be disposed on the touchscreen 150, or may be a part of the touchscreen 150, or may be disposed on the touchscreen 150 in another manner. In addition, the fingerprint sensor may be further implemented as a full-panel fingerprint sensor. Therefore, the touchscreen 150 may be considered as a panel on which a fingerprint may be collected at any location. In some embodiments, the fingerprint sensor may process a collected fingerprint (for example, verify the collected fingerprint), and send a fingerprint processing result (for example, whether the fingerprint passes verification) to the processor 101, and the processor 101 performs corresponding processing based on the fingerprint processing result. In some other embodiments, the fingerprint sensor may further send the collected fingerprint to the processor 101, so that the processor 101 processes the fingerprint (for example, verifies the fingerprint). The fingerprint sensor in this embodiment of this application may use any type of sensing technology, including but not limited to an optical sensing technology, a capacitive sensing technology, a piezoelectric sensing technology, an ultrasonic sensing technology, or the like. In addition, for a specific technical solution of integrating the fingerprint sensor into the touchscreen in this embodiment of this application, refer to patent application No. US 2015/0036065 A1, filed with the United States Patent and Trademark Office and entitled "FINGERPRINT SENSOR IN AN ELECTRONIC DEVICE", which is incorporated in the embodiments of this application by reference in its entirety. In addition, the mobile phone 200 may be further configured with another sensor such as a gyroscope, a barometer, a hygrometer, a thermometer, or an infrared sensor. Details are not described herein.

The Wi-Fi apparatus 107 is configured to provide the mobile phone 100 with network access that complies with a related Wi-Fi standard protocol. The mobile phone 100 may access a Wi-Fi access point by using the Wi-Fi apparatus 107, to help the user receive and send an email, browse a web page, access streaming media, and the like. The Wi-Fi apparatus 107 provides wireless broadband internet access for the user. In some other embodiments, the Wi-Fi apparatus 207 may alternatively serve as the Wi-Fi wireless access point, and may provide Wi-Fi network access to another electronic device.

The peripheral interface 108 is configured to provide various interfaces for an external input/output device (for example, a keyboard, a mouse, a display externally connected to the mobile phone 100, an external memory, or a subscriber identification module card). For example, the peripheral interface 108 is connected to the mouse by using a universal serial bus interface, and is connected to a SIM card provided by an operator by using a metal contact on a card slot of the subscriber identification module card. The peripheral interface 108 may be configured to couple the external input/output peripheral device to the processor 101 and the memory 103.

The mobile phone 100 may further include the power supply apparatus 109 (for example, a battery and a power management chip) that supplies power to the components. The battery may be logically connected to the processor 101 by using the power management chip, to perform functions such as charging management, discharging management, and power consumption management by using the power supply apparatus 109.

Although not shown in FIG. 1, the mobile phone 100 may further include a Bluetooth apparatus, a positioning apparatus, a flash, a micro projection apparatus, a near field communication (near field communication, NFC) apparatus, and the like. Details are not described herein. The front-facing camera may be configured to capture facial feature information, and the processor 101 may perform facial recognition on the facial feature information, to perform subsequent processing.

All the following embodiments may be implemented in the electronic device (for example, the mobile phone 100 or the tablet computer) having the foregoing hardware structure.

An electronic device operation method provided in an embodiment of this application may be applied to an electronic device having dual display screens. The dual-screen electronic device may be implemented in a plurality of manners. For example, for an electronic device having a foldable flexible display screen, when the flexible display screen of the electronic device is folded into a front-to-rear screen state, the electronic device may be used as the dual-screen electronic device in this embodiment of this application. For another example, for an electronic device having a splicing display screen, the electronic device has two screens, and the two screens are spliced together (for example, a foldable mobile phone including the two screens that are spliced together). The electronic device may be used as the dual-screen electronic device in this embodiment of this application. For still another example, a display screen is fastened on a front side of an electronic device, and a display screen is fastened on a rear side of the electronic device, for example, a dual-screen mobile phone. The electronic device operation method provided in this embodiment of this application is applicable to any one of the foregoing dual-screen electronic devices, and is also applicable to another type of electronic device having dual display screens or an electronic device having a plurality of display screens.

The following provides description by using an example in which a display screen is fastened on a front side of an electronic device and a display screen is fastened on a rear side of the electronic device.

Figure 3B:
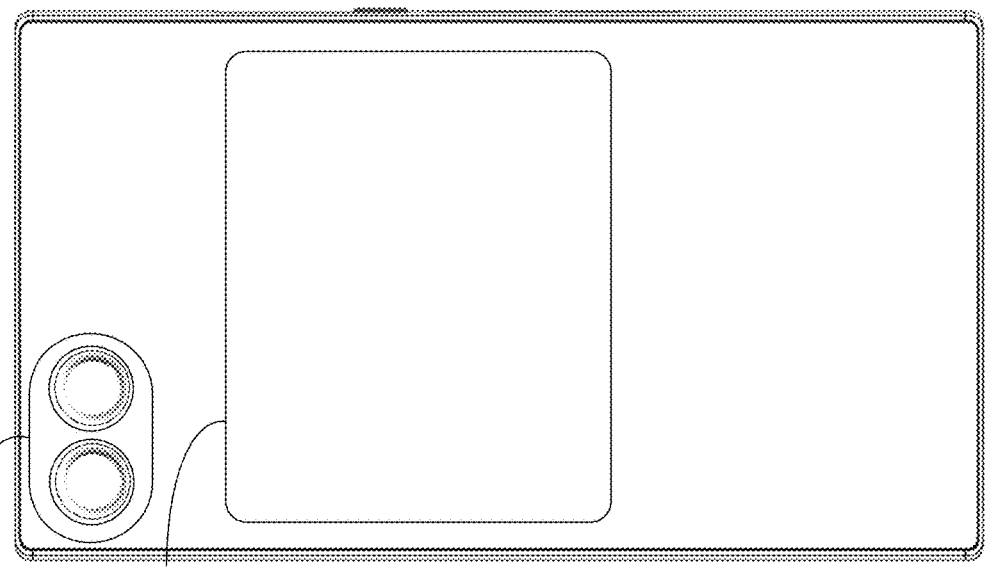
FIG. 3(a) to FIG. 3(b) are schematic diagrams of a front side and a rear side of a mobile phone according to an embodiment of the present invention.
Figure 3A:
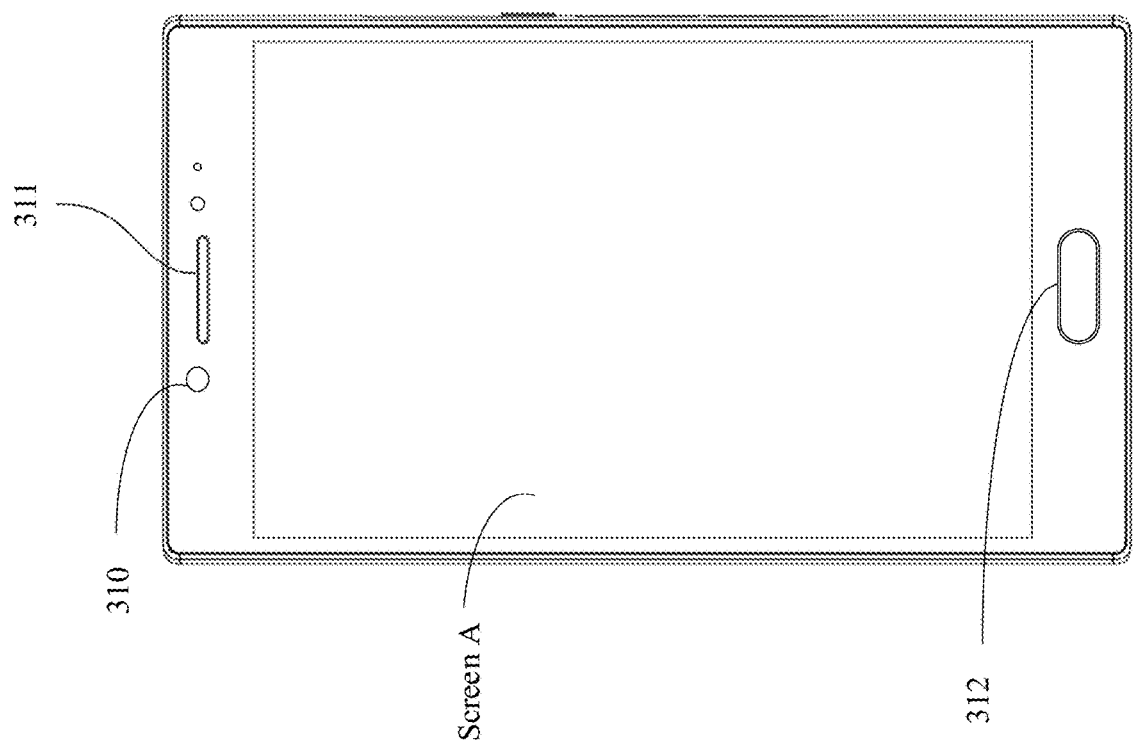

FIG. 3(a) and FIG. 3(b) are schematic structural diagrams of a dual-screen mobile phone according to an embodiment of this application. FIG. 3(a) is a schematic diagram of a front side of a mobile phone 100. The front side of the mobile phone 100 includes a front-facing camera 310, an earpiece 311, a home (home) button 312 (used to return to a home screen), and a screen A. FIG. 3(b) is a schematic diagram of a rear side of the mobile phone 100. The rear side of the mobile phone 100 includes a rear-facing camera 313 and a screen B. In the following, for example, both the screen A and the screen B are touchscreens, and a size of the screen B is less than that of the screen A.

It can be learned from FIG. 3(a) and FIG. 3(b) that some components of the mobile phone 100 are disposed on a surface on which the screen A is located. When functions of these components are enabled, it is more convenient for a user to perform an operation on the surface on which the screen A is located. Some other components of the mobile phone 100 are disposed on a surface on which the screen B is located. When functions of these components are enabled, it is more convenient for the user to perform an operation on the surface on which the screen B is located. Therefore, in some embodiments of this application, when the screen B of the mobile phone 100 is in a screen-on state (for example, the user is operating on the screen B), and the screen A of the mobile phone 100 is in a screen-off state, if the mobile phone 100 detects an operation for starting a component on the surface on which the screen A is located, the user may be prompted to flip the mobile phone to perform an operation on the surface on which the screen A is located.

Which components can be used on only the screen A may be determined by a mobile phone manufacturer. As shown in FIG. 3(a) and FIG. 3(b), components such as the earpiece 311 and the front-facing camera 310 are disposed on the surface on which the screen A is located, and the rear-facing camera 313 is disposed on the surface on which the screen B is located. It should be understood that FIG. 3(a) and FIG. 3(b) are merely examples. In actual application, more or fewer components than those shown in FIG. 3(a) and FIG. 3(b) may be disposed on the surface on which the screen A of the mobile phone is located, and more or fewer components than those shown in FIG. 3(a) and FIG. 3(b) may also be disposed on the surface on which the screen B of the mobile phone is located. This is not limited in the embodiments of this application.

For example, FIG. 4(a) to FIG. 4(d) are schematic diagrams of graphical user interfaces on display screens of a mobile phone according to an embodiment of the present invention.

Figure 4A:
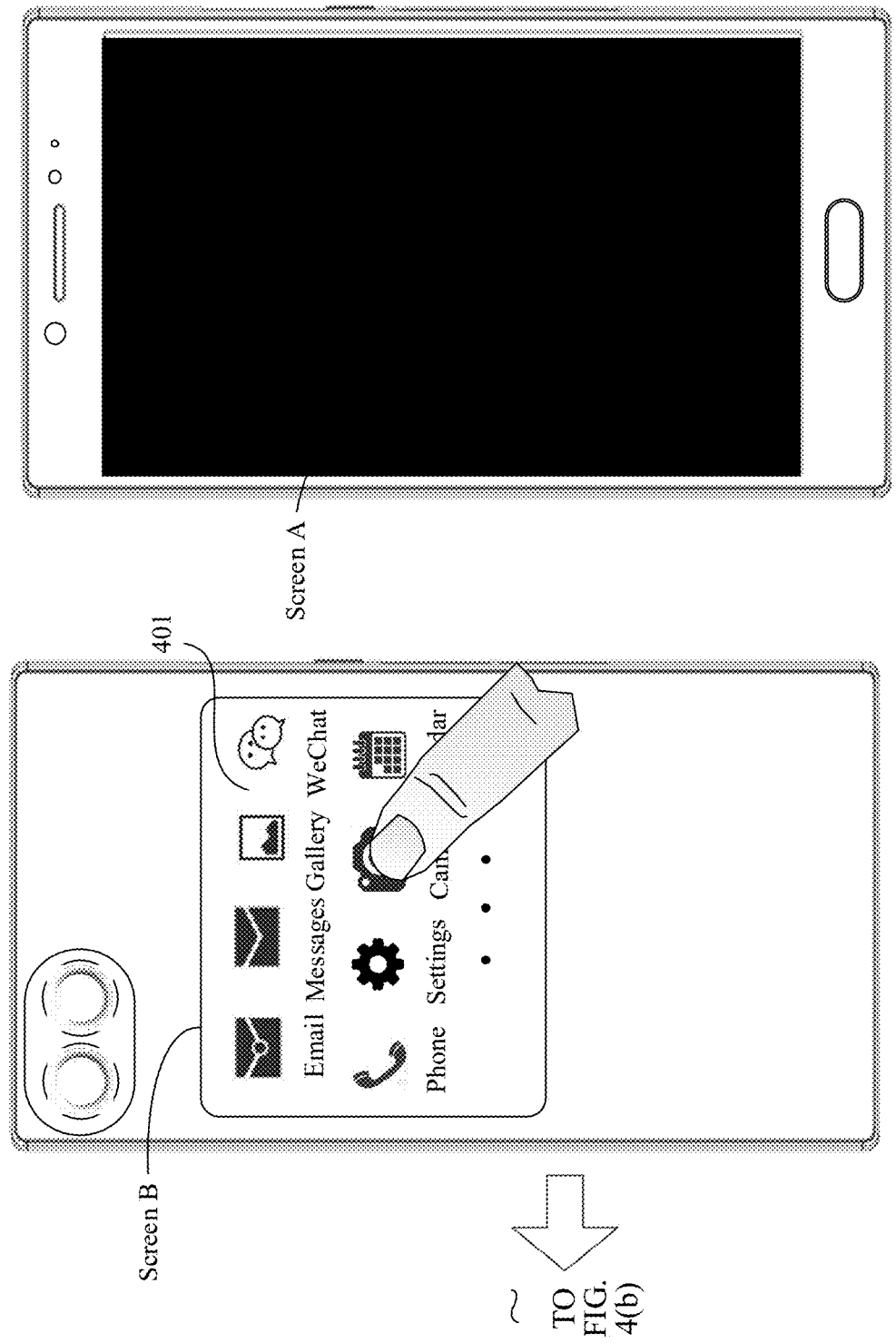
Figure 4D:
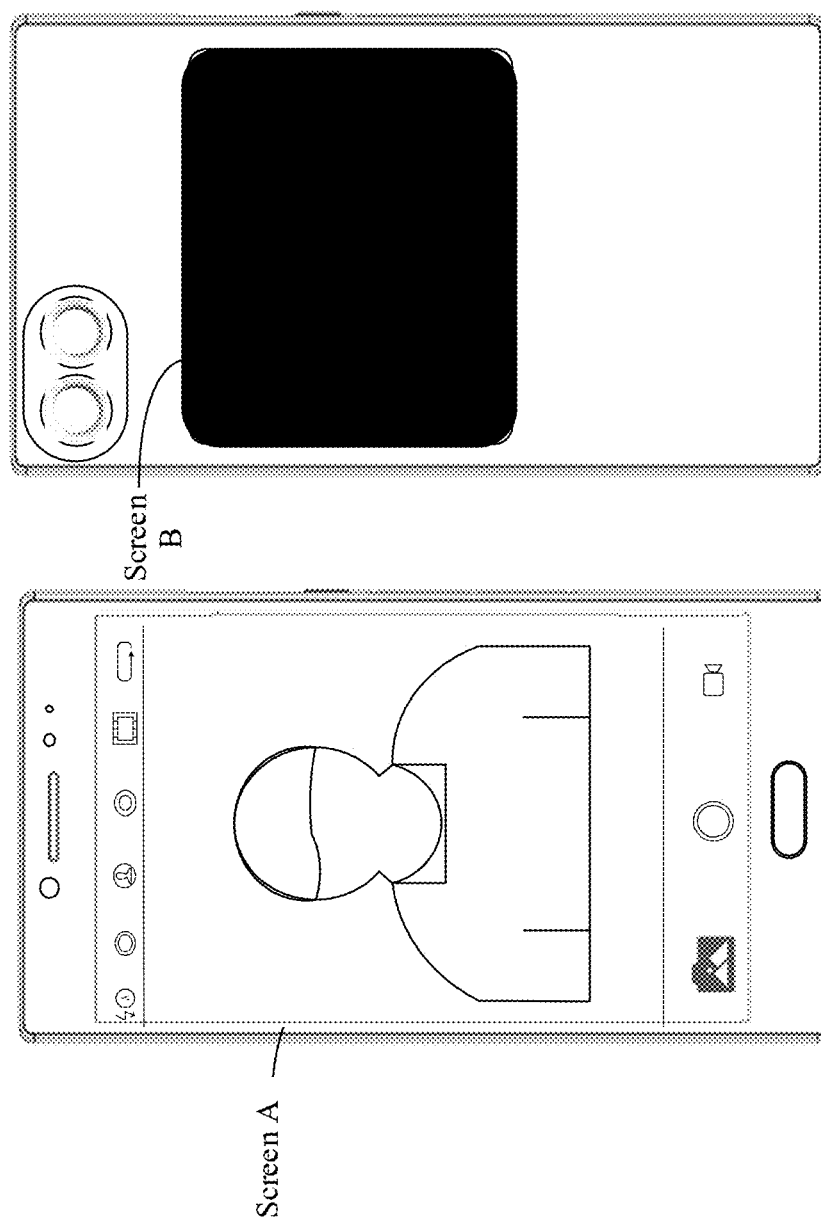

As shown in FIG. 4(a), a screen A of the mobile phone 100 is in a screen-off state, and a screen B of the mobile phone 100 is in a screen-on state. A home screen 401 is displayed on the screen B, and the home screen 401 includes icons of a plurality of application programs. After detecting an operation of tapping an icon of a camera application on the home screen 401 by a user, the mobile phone 100 enables a rear-facing camera. The rear-facing camera collects a face of the user. Therefore, as shown in FIG. 4(b), a preview screen 402 of the camera is displayed on the screen B, and the face of the user is displayed on the preview screen 402.

In this scenario, the user uses the rear-facing camera of the mobile phone 100 to take a selfie. The size of the screen B is smaller, and the user may prefer displaying a selfie image on a larger screen, that is, the screen A. In a possible implementation, the user may manually switch the rear-facing camera to a front-facing camera. For example, the user may tap a camera switching control 403 on the preview screen 402 displayed on the screen B, to switch the rear-facing camera to the front-facing camera.

In some embodiments of this application, when the mobile phone 100 detects an operation of tapping the camera switching control 403 on the preview screen 402 by the user, the mobile phone 100 may prompt the user to flip the mobile phone 100 to perform an operation on a surface (that is, the front side shown in FIG. 3(*a*) and FIG. 3(*b*)) on which the front-facing camera is located.

For example, the mobile phone 100 may prompt, in a plurality of manners, the user to flip the mobile phone 100 to perform an operation on the surface on which the front-facing camera is located. For example, as shown in FIG. 4(*c*), the mobile phone 100 may display prompt information 404 on the screen B, and the prompt information 404 is used to prompt "Please flip the mobile phone to the front side for operation". Certainly, the mobile phone 100 may further prompt the user in another manner. For example, the mobile phone 100 may play voice information by using a speaker, to prompt the user to flip the mobile phone 100 to the surface on which the screen A is located to perform an operation. For another example, the mobile phone 100 may vibrate, to prompt the user to flip the mobile phone 100 to the surface on which the screen A is located to perform an operation. It should be noted that, if the mobile phone 100 plays a ringtone for an incoming call when receiving the incoming call, the mobile phone 100 may display prompt information on the screen B, or may pause to play the ringtone for the incoming call, but play voice prompt information.

Figure 5A:
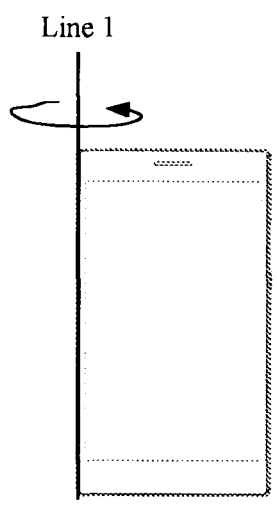
FIG. 5A to FIG. 5C are schematic diagrams of a graphical user interface on a display screen of a mobile phone according to an embodiment of the present invention.
Figure 5B:
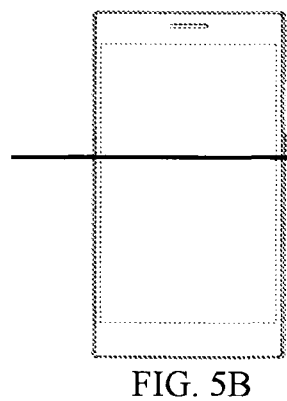
Figure 5C:
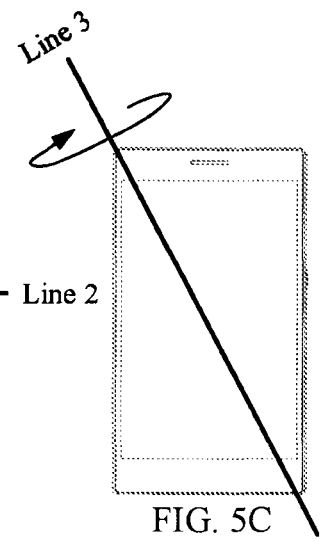

In this embodiment of this application, when detecting the operation of tapping the camera switching control 403 on the preview screen 402 by the user, the mobile phone 100 may immediately enable the front-facing camera, or may enable the front-facing camera after a period of time. For example, the mobile phone 100 enables the front-facing camera after detecting that the mobile phone 100 is rotated and a rotation angle is not less than a preset angle. It may be understood that the preset angle may be set based on a corresponding requirement. For example, the preset angle may be set to 5°, 10°, or 180°. When the preset angle is 180°, the mobile phone 100 enables the front-facing camera after detecting that the mobile phone 100 is flipped from a rear side facing the user to a front side facing the user. As shown in FIG. 5A, the mobile phone 100 may be rotated clockwise by using a line 1 as an axis; or as shown in FIG. 5B, the mobile phone 100 may be rotated counterclockwise by using a line 2 as an axis; or as shown in FIG. 5C, the mobile phone 100 may be rotated clockwise by using a line 3 as an axis.

In some embodiments, to reduce power consumption, after enabling the front-facing camera, the mobile phone 100 may further disable the rear-facing camera. For example, the mobile phone 100 disables the rear-facing camera after detecting that the rotation angle is not less than the preset angle.

Because the screen A of the mobile phone 100 is still in the screen-off state, in some embodiments of this application, the mobile phone 100 may further turn on the screen A while, before, or after the mobile phone 100 displays the prompt information 404 on the screen B. Specifically, one of the following manners may be used:

Manner 1: The mobile phone 100 may turn on the screen A while detecting that the user taps the camera switching control 403 on the preview screen 402. In other words, the mobile phone 100 turns on the screen A before displaying the prompt information 404.

Manner 2: The mobile phone 100 turns on the screen A while displaying the prompt information on the screen B, as shown in FIG. 4(*c*).

Manner 3: The mobile phone 100 turns on the screen A after displaying the prompt information on the screen B for a period of time. The period of time may be set before delivery of the mobile phone 100, for example, three seconds. The period of time may alternatively be defined by the user. The period of time may alternatively be average time that is required for the user to flip the mobile phone 100 from the rear side to the front side and that is determined by the mobile phone 100 through self-learning.

Manner 4: The mobile phone 100 turns on the screen A after detecting that the mobile phone 100 is flipped and the rotation angle is not less than the preset angle.

In some embodiments of this application, the mobile phone 100 turns on the screen A. Display content on the screen A may be the same as or different from display content on the screen B.

In an example, the mobile phone 100 turns on the screen A, and displays a preview screen of a camera application on the screen A. If the mobile phone 100 turns on the screen A in Manner 1 or Manner 2, the mobile phone 100 displays the preview screen of the camera application on the turned-on screen A. Because the user does not flip the mobile phone, a scene opposite to the user is collected by the front-facing camera, and the scene opposite to the user is displayed on the preview screen of the screen A. Still as shown in FIG. 4(*c*), the mobile phone 100 turns on the screen A, and displays a preview screen 605 of the camera application on the screen A, where an image collected by the front-facing camera is displayed on the preview screen 605. After the user flips the mobile phone 100, the front-facing camera collects the face of the user. In other words, the mobile phone 100 displays the face of the user on the screen A, as shown in FIG. 4(*d*).

If the mobile phone 100 turns on the screen A in Manner 1 or Manner 2, and displays the preview screen of the camera application on the screen A, to prevent the user from accidentally touching a control on the screen A in a process of flipping the mobile phone, the mobile phone 100 may disable a touch function of the screen A within a preset time after the screen A is turned on. In other words, when the user triggers the screen A, the screen A does not respond. Similarly, the mobile phone 100 may also disable a touch function of the screen B within the preset time, to prevent the user from accidentally touching the screen B in the process of flipping the mobile phone 100.

In some embodiments of this application, to reduce power consumption, the mobile phone 100 may turn off the screen B when turning on the screen A. Alternatively, the mobile phone 100 automatically turns off the screen B after displaying the prompt information 404 on the screen B for a period of time (for example, three seconds).

In another example, when the mobile phone 100 turns on the screen A, the mobile phone 100 does not display the preview screen of the camera application on the screen A, but displays another interface. For example, after the mobile phone 100 turns on the screen A, the mobile phone 100 displays a home screen on the screen A.

For example, if the mobile phone 100 turns on the screen A in Manner 1 or Manner 2, the mobile phone 100 may display the home screen on the screen A. When the mobile phone 100 detects that the mobile phone 100 is rotated and the screen A faces the user, the mobile phone 100 displays the preview screen of the camera application on the screen A. In other words, before the user flips the mobile phone, the mobile phone 100 only turns on the screen A, and displays the home screen rather than the preview screen of the camera application on the screen A. After the user flips the mobile phone to enable the screen A to face the user, the mobile phone 100 enables the camera application, and displays the preview screen of the camera application on the screen A.

Optionally, the mobile phone 100 may detect, by using an acceleration sensor, a speed sensor, a gyroscope, or the like, that the mobile phone 100 is rotated. Details are not described in this embodiment of this application.

For example, FIG. 6(a) to FIG. 6(f) are schematic diagrams of graphical user interfaces on display screens of a mobile phone according to an embodiment of the present invention.

Figure 6A:
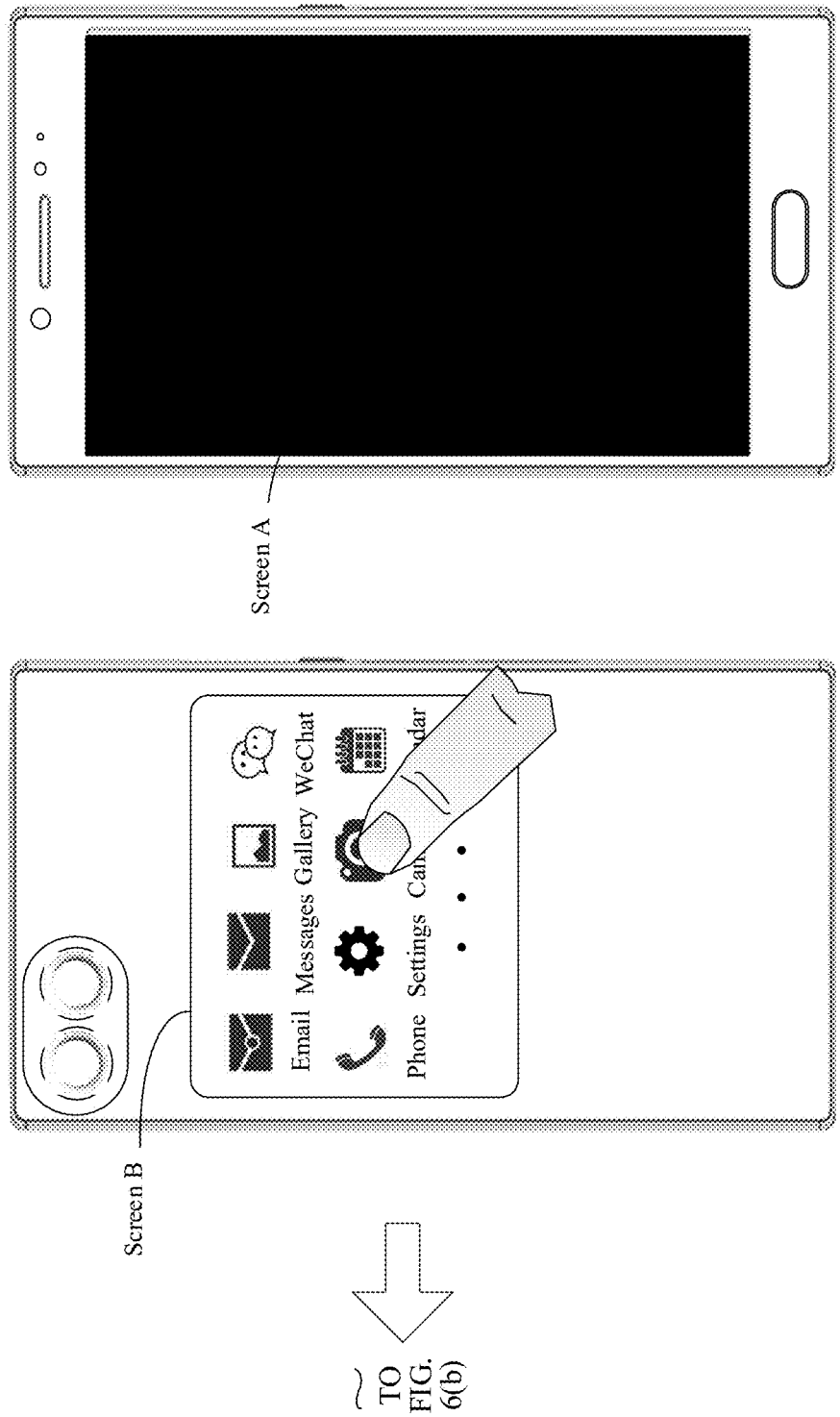
Figure 6C:
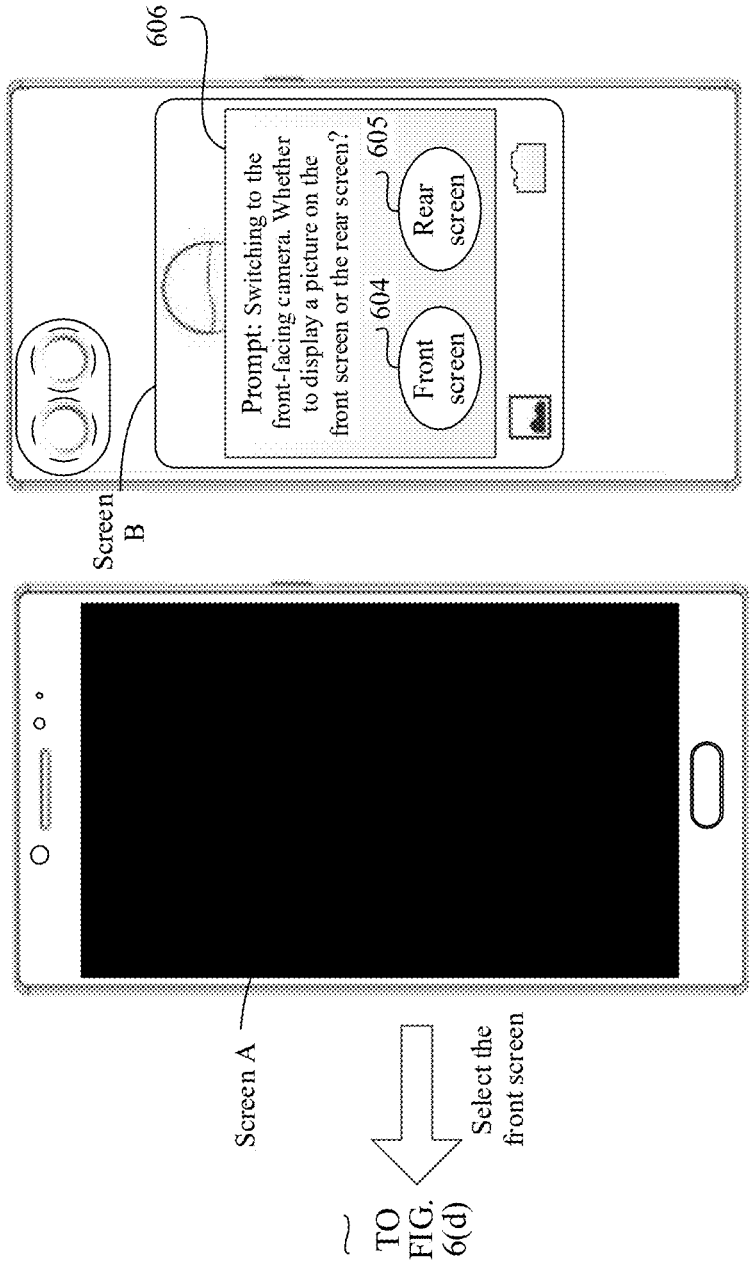
Figure 6D:
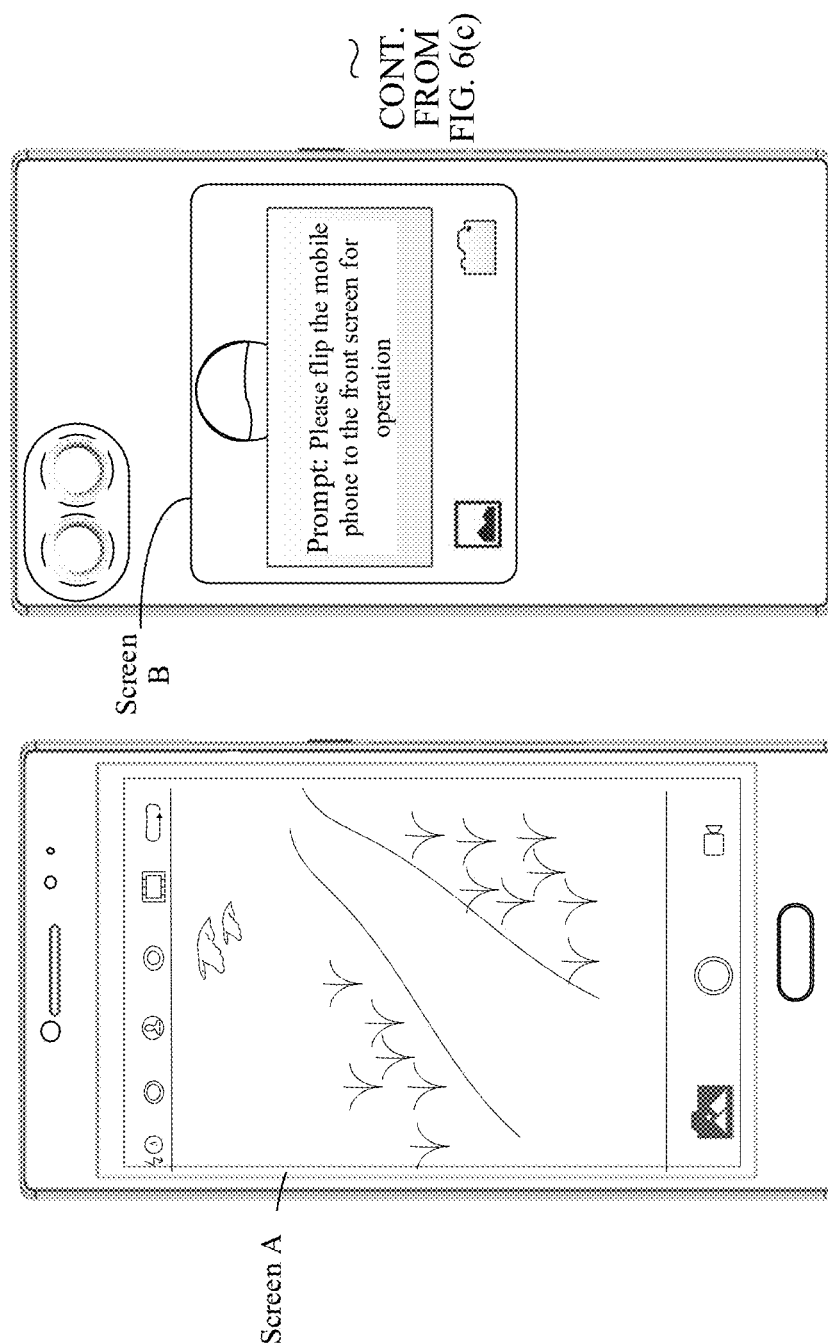

As shown in FIG. 6(a) to FIG. 6(f), a screen A of the mobile phone 100 is in a screen-off state, and a screen B of the mobile phone 100 is in a screen-on state. FIG. 6(a) and FIG. 6(b) are similar to FIG. 4(a) and FIG. 4(b), and therefore details are not described. In FIG. 6(b), when the mobile phone 100 detects that a user triggers a camera switching control 603 on a preview screen 602, the mobile phone 100 displays a prompt box 602, where prompt information, a front screen control 604, and a rear screen control 605 are displayed in the prompt box 603. As shown in FIG. 6(c), the prompt information is used to prompt "Switching to the front-facing camera. Whether to display a picture on a front screen or a rear screen". If the mobile phone 100 detects that the user triggers the front screen control 604, the mobile phone 100 performs operations according to FIG. 6(d) and FIG. 6(e). FIG. 6(d) and FIG. 6(e) are similar to FIG. 4(c) and FIG. 4(d), and therefore details are not described. If the mobile phone 100 detects that the user triggers the rear screen control 605, the mobile phone 100 displays a picture, namely, an image (a plant image) that is opposite to the user and collected by the front-facing camera, on the screen B. However, in this case, the screen A is still in the screen-off state.

In the scenario shown in FIG. 6(a) to FIG. 6(f), when the user performs an operation on the preview screen displayed on the screen B, if the user switches a rear-facing camera to the front-facing camera, the image collected by the front-facing camera may be displayed on the screen A or displayed on the screen B based on selection of the user. This helps improve user experience.

Figure 7A:
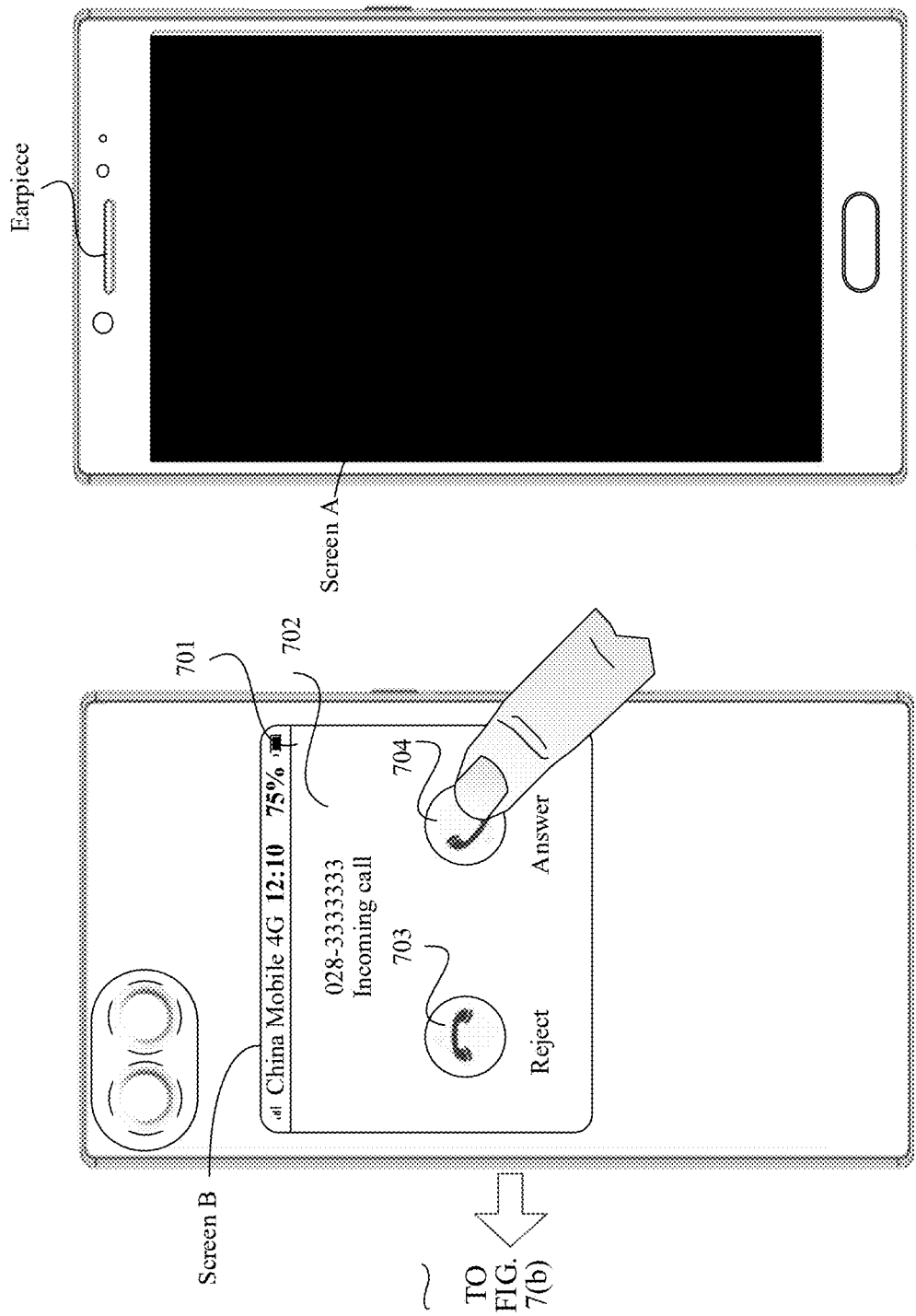

For example, FIG. 7(a) to FIG. 7(c) are schematic diagrams of graphical user interfaces on display screens of a mobile phone according to an embodiment of the present invention.

As shown in FIG. 7(a), a screen A of the mobile phone 100 is in a screen-off state, and a screen B of the mobile phone 100 is in a screen-on state. The mobile phone 100 receives an incoming call, and displays an incoming call screen 701 on the screen B. The incoming call screen 701 includes an incoming call number 702, a reject control 703, and an answer control 704.

Because an earpiece is located on a surface on which the screen A is located, if a user wants to answer the incoming call, the user needs to flip the mobile phone to perform an operation (that is, answer the incoming call) on the surface on which the screen A is located. Therefore, in some embodiments of this application, the mobile phone 100 prompts, in a plurality of manners, the user to flip the mobile phone to perform an operation (answer the incoming call) on the surface on which the screen A is located. The following provides two examples.

In a first example, the screen A of the mobile phone 100 is in the screen-off state, and the screen B of the mobile phone 100 is in the screen-on state. After receiving the incoming call, the mobile phone 100 displays the incoming call screen 701 on the screen B. In this case, a prompt box may be displayed on the screen B, prompt information is displayed in the prompt box, and the prompt information is used to prompt the user to flip the mobile phone to perform an operation on the front side.

For example, the mobile phone 100 may immediately display the prompt box on the screen B while displaying the incoming call screen 701 on the screen B, or may display the prompt box after displaying the incoming call screen 701 on the screen B for a period of time (for example, three seconds).

In a second example, the screen A of the mobile phone 100 is in the screen-off state, and the screen B of the mobile phone 100 is in the screen-on state. After receiving the incoming call, the mobile phone 100 displays the incoming call screen 701 on the screen B. As shown in FIG. 7(b), when the mobile phone 100 detects that the user triggers the answer control 704, the mobile phone 100 displays a prompt box 705 on the screen B, and displays text information in the prompt box 705: "Please flip the mobile phone to perform an operation on the front side." (The text information in the figure is merely an example, and the text information may be "The earpiece is on the front side. Please perform an operation on the front side" and the like. This is not limited in this embodiment of this application.) The mobile phone 100 may not display a prompt box when detecting that the user triggers the reject control 705.

The foregoing two examples are different. In the second example, the mobile phone 100 displays the prompt box on the screen B only when detecting that the user triggers the answer control 704. In the first example, after displaying the incoming call screen 701 on the screen B, the mobile phone 100 may automatically display the prompt box without an operation of the user.

In FIG. 7(a) to FIG. 7(c), for example, the prompt box 705 is displayed at a central location of the screen B. In actual application, the prompt box 705 may alternatively be displayed in a notification bar on the screen B, or may be displayed at another location. This is not limited in this embodiment of this application. The prompt box 705 may automatically disappear after displaying for a particular time (for example, three seconds). Alternatively, the mobile phone 100 may hide the prompt box when detecting that the user performs a preset operation. For example, the mobile phone 100 hides the prompt box when detecting that the user selects the prompt box 705 and swipes left or right.

In the first example, after receiving the incoming call, the mobile phone 100 displays the incoming call screen 702 on the screen B. In this case, the user may not want to answer the incoming call. In a possible implementation, the mobile phone 100 hides the prompt box when detecting that the user selects the prompt box 705 and swipes left or right. Then, the mobile phone 100 hangs up the incoming call when detecting that the user triggers the reject control 703.

Because the screen A of the mobile phone 100 is still in the screen-off state, in some embodiments of this application, the mobile phone 100 may further turn on the screen A while, before, or after the mobile phone 100 displays the prompt box 705 on the screen B. Certainly, the mobile phone 100 may not turn on the screen A if detecting that the user triggers the reject control 705 on the screen B. Specifically, the mobile phone 100 may turn on the screen A in one of the following manners.

Manner 1: The mobile phone 100 may turn on the screen A while displaying the prompt box 705.

If Manner 1 is used in the first example, after turning on the screen A, the mobile phone 100 displays an incoming call screen on the screen A. The user may select whether to answer the incoming call by using the answer control and the reject control included on the incoming call screen. If Manner 1 is used in the second example, after turning on the screen A, the mobile phone 100 displays a calling screen on the screen A (the user already taps the answer control on the screen B). The calling screen includes call duration and the incoming call number. As shown in FIG. 7(b), the screen A is turned on, and a calling screen 706 is displayed on the screen A. The calling screen 706 includes the incoming call number and the call duration.

Manner 2: The mobile phone 100 may turn on the screen A when detecting that the user taps the answer control 704 on the screen B. Manner 1 is applicable to the first example and the second example. For example, in the second example, after the mobile phone 100 displays the prompt box 705 on the screen B, the mobile phone 100 hides the prompt box when detecting that the user selects the prompt box 705 and swipes left or right. Then, the mobile phone 100 turns on the screen A when detecting that the user triggers the answer control 704. The mobile phone 100 may not turn on the screen A when detecting that the user taps the reject control 703 on the screen B.

In Manner 2, after turning on the screen A, the mobile phone 100 displays a calling screen on the screen A (the user already taps the answer control on the screen B).

In Manner 1 and Manner 2, after turning on the screen A, the mobile phone 100 may disable a touch function of the screen A for a period of time. When detecting that the mobile phone 100 is rotated and a rotation angle is not less than a preset angle, the mobile phone 100 enables the touch function of the screen A, to prevent the user from accidentally touching a button on the screen A in a process of flipping the mobile phone.

Manner 3: The mobile phone 100 may temporarily not turn on the screen A, and turn on the screen A after the mobile phone 100 detects that the mobile phone 100 is flipped and a rotation angle is not less than a preset angle.

If Manner 3 is used in the first example, after turning on the screen A, the mobile phone 100 displays an incoming call screen on the screen A. The user may select whether to answer the incoming call by using the answer control and the reject control included on the incoming call screen. If Manner 3 is used in the second example, after turning on the screen A, the mobile phone 100 displays a calling screen on the screen A (the user already taps the answer control on the screen B). The calling screen includes call duration and the incoming call number.

In actual application, the mobile phone 100 may further turn on the screen A at another moment. For example, when the screen A is in a screen-off state, and the screen B is in a screen-on state, the mobile phone 100 immediately turns on the screen A in response to receiving an incoming call, displays an incoming call screen on the screen A, and displays prompt information on the screen B, to prompt the user to answer the incoming call by using the earpiece on the front side.

In some other embodiments of this application, after the screen A is turned on, same content may be displayed on the screen A and the screen B. For example, in the first example, after the screen A is turned on, an incoming call screen is displayed on the screen A, and an incoming call screen is also displayed on the screen B. For example, in the second example, after the screen A is turned on, a calling screen is displayed on the screen A, and a calling screen is also displayed on the screen B. If the screen A is turned on, an incoming call screen is displayed on the screen A, and an incoming call screen is also displayed on the screen B, the mobile phone 100 turns off the screen A when detecting that the user taps the reject control on the incoming call screen on the screen B. If the screen A is turned on, a calling screen is displayed on the screen A, and a calling screen is also displayed on the screen B, the mobile phone 100 turns off the screen A when detecting that the user taps a hang-up control on the calling screen on the screen B.

In some other embodiments of this application, as shown in FIG. 7(c), to save power, the mobile phone 100 may turn off the screen B when turning on the screen A. Alternatively, the mobile phone 100 automatically turns off the screen B after displaying the prompt box 705 on the screen B for a period of time (for example, three seconds).

In some other embodiments of this application, the mobile phone 100 may alternatively not turn on the screen A. For example, after detecting that the user taps the answer control 704 on the screen B, the mobile phone 100 displays the prompt information on the screen B to prompt the user to perform an operation on the front side. The user only needs to answer the incoming call by using the earpiece on the front side, and the screen A of the mobile phone 100 may remain in the screen-off state. If the user wants to hang up the call, the user may press a power button. For another example, after detecting that the user taps the answer control 704 on the screen B, the mobile phone 100 displays the prompt information on the screen B to prompt the user to answer the incoming call by using the earpiece on the front side. The screen A remains in the screen-off state, and the calling screen (including the incoming call number, the call duration, and the hang-up control) may be displayed on the screen B. If the user wants to hang up the call, the user may tap the hang-up control on the screen B.

Figure 8A:
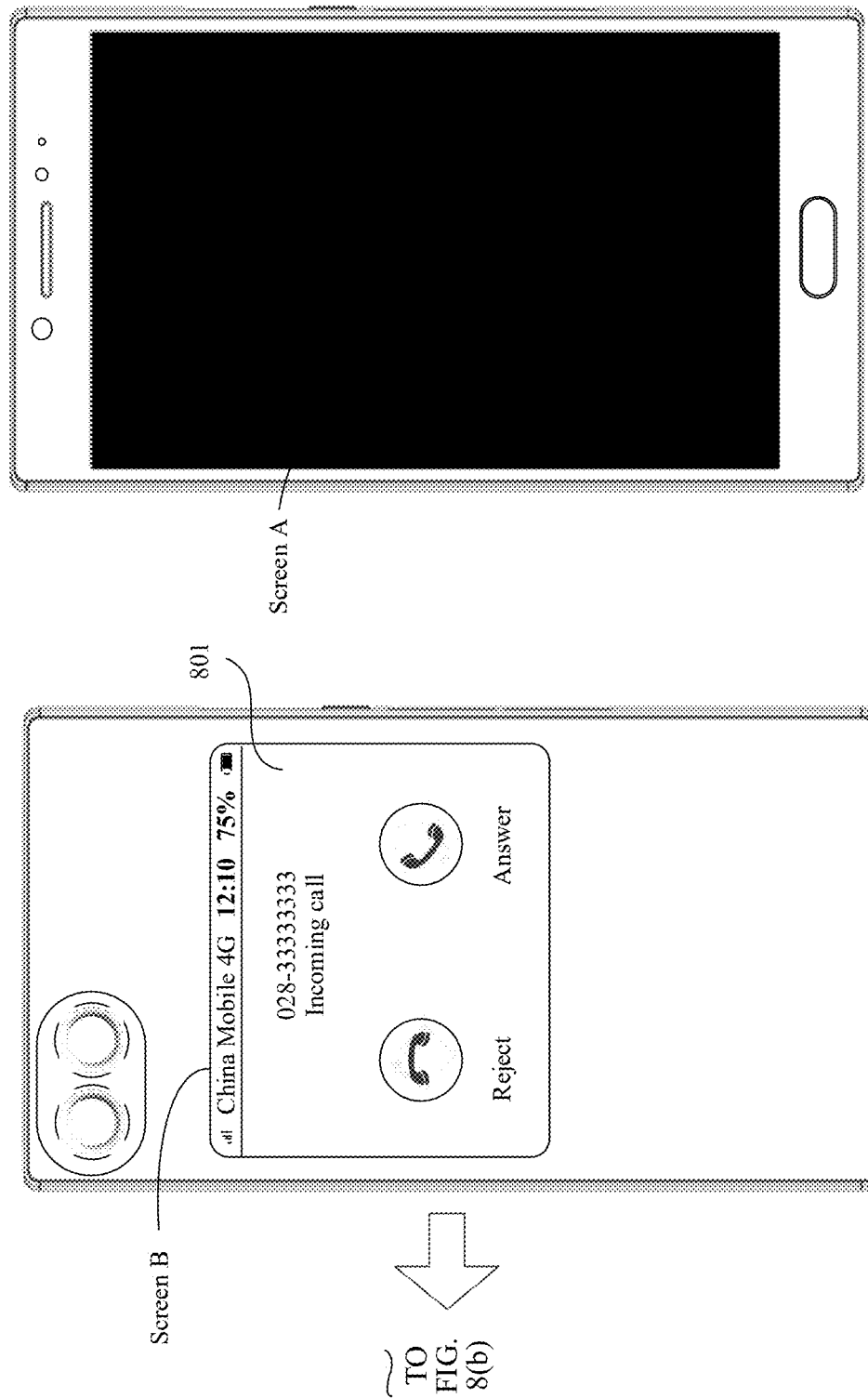

For example, FIG. 8(a) to FIG. 8(c) are schematic diagrams of graphical user interfaces on display screens of a mobile phone according to an embodiment of the present invention.

As shown in FIG. 8(a), a screen A of the mobile phone 100 is in a screen-off state, and a screen B of the mobile phone 100 is in a screen-on state. The mobile phone 100 receives an incoming call, and displays an incoming call screen 801 on the screen B. The mobile phone 100 may automatically display a prompt box 802, where prompt information is displayed in the prompt box 802 to prompt the user to perform an operation on a front screen. When the mobile phone 100 displays the prompt box 802, the mobile phone 100 may automatically turn on the screen A, and display the incoming call screen 801 on the screen A. To prevent the user from accidentally touching a control on the screen A in a process of flipping the mobile phone, the mobile phone 100 may disable a touch function of the screen A. When the mobile phone 100 detects that the mobile phone 100 is flipped and the screen A faces the user, the mobile phone 100 enables the touch function of the screen A.

In an example in FIG. 8(a) to FIG. 8(c), after the screen A is turned on, the screen B may not be turned off temporarily. If the user taps a reject control 803 on the screen B, the mobile phone 100 turns off the screen A.

It can be learned from the foregoing description that the earpiece is disposed on a surface on which the screen A is located. When the screen B is in the screen-on state and the screen A is in the screen-off state, if the user needs to use the earpiece in a process of performing an operation on the screen B, the mobile phone 100 may display the prompt information on the screen B to prompt the user to flip the mobile phone 100 to use the earpiece on the surface on which the screen A is located.

In the example shown in FIG. 8(*a*) to FIG. 8(*c*), the mobile phone 100 receives the incoming call. In actual application, there may be another scenario.

For example, the screen A of the mobile phone 100 is in the screen-off state, and the screen B of the mobile phone 100 is in the screen-on state. When the user performs an operation on the screen B of the mobile phone 100, and the mobile phone 100 receives a WeChat video call or a WeChat voice call, the mobile phone 100 may prompt, in a manner shown in FIG. 7(*a*) to FIG. 7(*c*) or FIG. 8(*a*) to FIG. 8(*c*), the user to flip the mobile phone to perform an operation on the surface on which the screen A is located.

For another example, the screen A of the mobile phone 100 is in the screen-off state, the screen B of the mobile phone 100 is in the screen-on state, and a WeChat chat screen is displayed on the screen B. When the mobile phone 100 receives WeChat voice information, the mobile phone 100 may prompt, in a manner shown in FIG. 7(*a*) to FIG. 7(*c*) or FIG. 8(*a*) to FIG. 8(*c*), the user to flip the mobile phone to perform an operation on the surface on which the screen A is located (listen to a voice message by using the earpiece on the surface on which the screen A is located).

For another example, the screen A of the mobile phone 100 is in the screen-off state, and the screen B of the mobile phone 100 is in the screen-on state. Because a size of the screen B is smaller, when a video playback screen or a game screen is displayed on the screen B, the mobile phone 100 may output the prompt information to prompt the user to flip the mobile phone to perform an operation on the surface on which the screen A is located (display the video playback screen or the game screen on the screen A). In this manner, the user can watch a video or play a game on a larger display screen, helping improve user experience.

In this embodiment of this application, the screen A of the mobile phone 100 has an ear print detection function. When the screen A detects an ear print of the user, it indicates that an ear of the user is relatively close to the screen A. In this case, the screen A is turned off. If the screen A does not detect an ear print of the user, it indicates that an ear of the user is far away from the screen A. In this case, the screen A is turned on. Optionally, the ear print detection function of the screen A may be always in an enabled state, or the ear print detection function of the screen A may be enabled after the mobile phone 100 detects that the user triggers the answer control on the incoming call screen.

It can be learned from the foregoing description that the earpiece is disposed on the surface on which the screen A is located. When the screen A of the mobile phone 100 is in the screen-off state and the screen B is in the screen-on state, if the mobile phone 100 detects that the user needs to use the earpiece in a process of performing an operation on the screen B, the mobile phone 100 may prompt the user to flip the mobile phone to perform an operation on the surface on which the screen A is located. In this manner, a user operation can be facilitated, and interaction between the user and the mobile phone is improved to some extent.

It can be learned from the foregoing description that, for a dual-screen mobile phone, one screen of the mobile phone may be set as a bezel-less screen. In other words, components such as an earpiece and a camera are not disposed on a surface on which the screen is located. Components such as the earpiece and the camera are disposed on a surface on which the other screen of the mobile phone is located. For example, in FIG. 2, the screen A may be set as the bezel-less screen, and the earpiece, the camera, and the like may be disposed on the surface on which the screen B is located. When the user needs to invoke the earpiece or the camera in a process of performing an operation on the bezel-less screen, namely, the screen A, the user is prompted to flip the mobile phone to perform an operation on the surface on which the screen B is located.

In some other embodiments of this application, the screen A of the mobile phone 100 is in the screen-off state, and the screen B of the mobile phone 100 is in the screen-on state. If the mobile phone 100 detects an operation of flipping the mobile phone by the user, and detects that the screen A faces the user, the mobile phone 100 turns on the screen A and turns off the screen B.

Figure 9A:
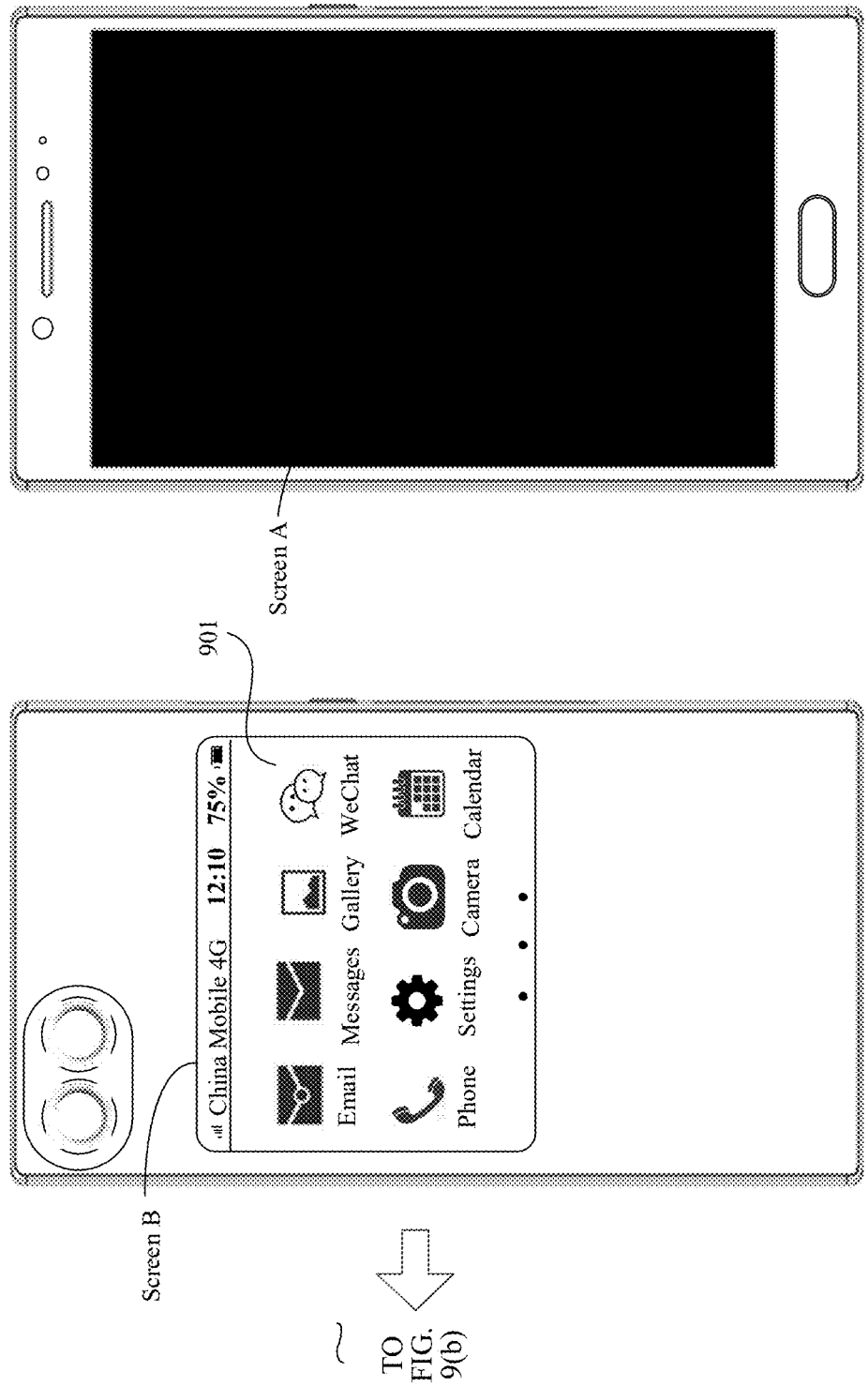
Figure 9C:
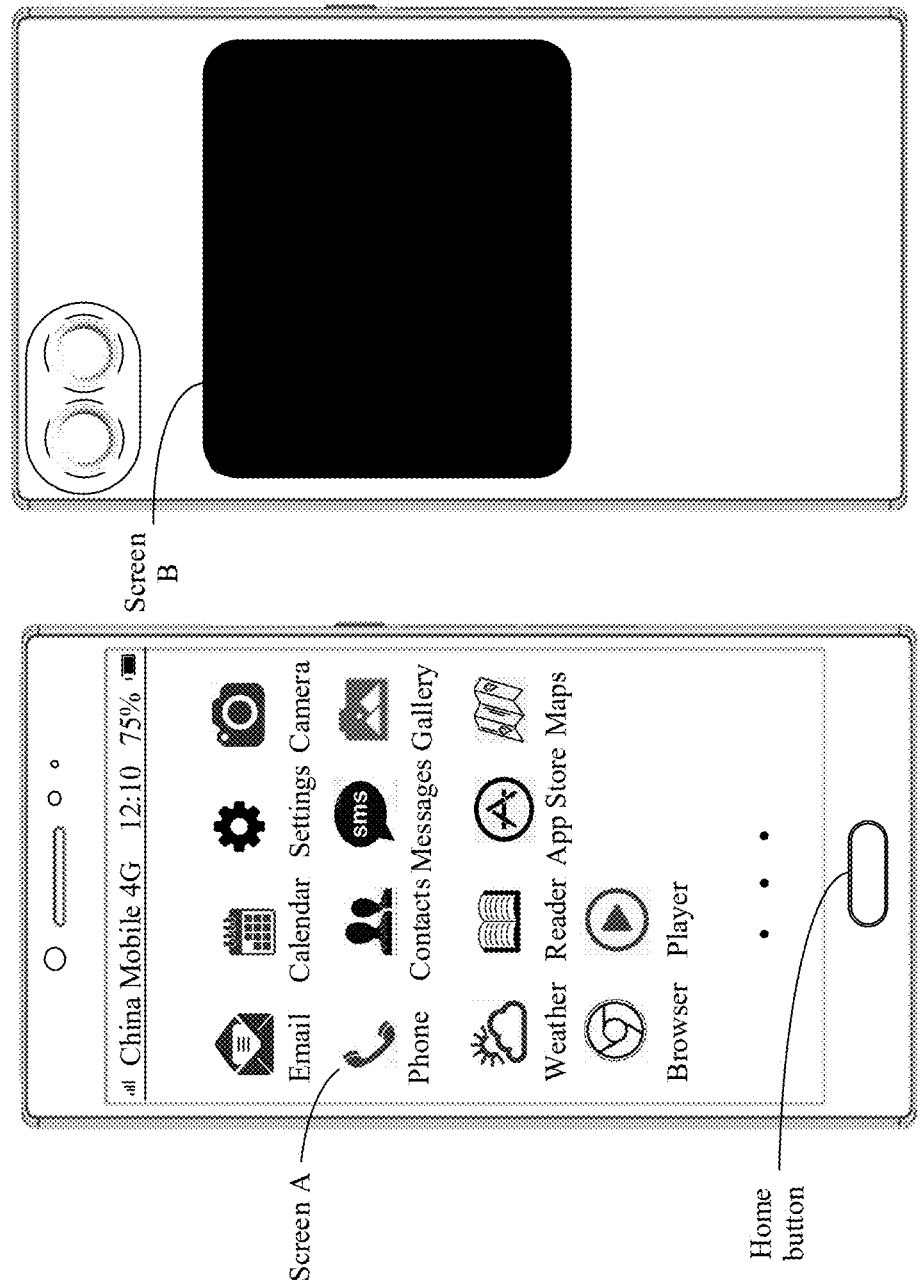

For example, FIG. 9(*a*) to FIG. 9(*c*) are schematic diagrams of graphical user interfaces on a mobile phone according to an embodiment of this application.

As shown in FIG. 9(*a*), a screen A of the mobile phone 100 is in a screen-off state, and a screen B of the mobile phone 100 is in a screen-on state. The mobile phone 100 displays a home screen 901 on the screen B. In a process in which a user performs an operation on the screen B of the mobile phone 100, if the user wants to perform an operation on the screen A, the user may flip the mobile phone 100. As shown in FIG. 8(*b*), the user may flip the mobile phone 100 based on an axis 1 in the figure. When the mobile phone 100 detects an operation of flipping the mobile phone 100 by the user, the mobile phone 100 turns on the screen A, displays a home screen on the screen A, and turns off the screen B.

In FIG. 9(*a*) to FIG. 9(*c*), the user flips the mobile phone 100 based on the axis 1. In an actual operation, the user may flip the mobile phone based on another axis. For example, the user flips the mobile phone 100 based on an axis 2 or an axis 3 shown in FIG. 9(*b*) (indicated by dashed lines in the figure), to turn on the screen A and turn off the screen B.

In FIG. 9(*a*) to FIG. 9(*c*), the user flips the mobile phone in a direction indicated by an arrow. In an actual operation, a direction in which the user flips the mobile phone is not limited.

It can be learned from FIG. 9(*a*) to FIG. 9(*c*) that sizes of the screen B and the screen A are different. When the home screen includes a relatively large quantity of icons of application programs, the screen B is turned off. When the home screen is displayed on the screen A, a type and a quantity of application programs displayed on the home screen on the screen A may be different from those displayed on the screen B.

In some other embodiments of this application, the screen A of the mobile phone 100 is in the screen-off state, and the screen B of the mobile phone 100 is in the screen-on state. In this case, although the screen A is in the screen-off state, a function module that is on the screen A and that is configured to detect a gesture operation is in a working state. Therefore, the screen A can still detect a gesture operation of the user on the screen A. The gesture operation may be an operation such as tapping, double tapping, or drawing a circle. The double-tap operation is used as an example. When the screen A detects a double-tap operation of the user on the screen A, the screen A is turned on. When turning on the screen A, the mobile phone 100 may turn off the screen B.

For example, FIG. 10(*a*) and FIG. 10(*b*) are schematic diagrams of graphical user interfaces on a mobile phone according to an embodiment of this application.

As shown in FIG. 10(*a*), a screen A of the mobile phone 100 is in a screen-off state, and a screen B of the mobile phone 100 is in a screen-on state. As shown in FIG. 10(*b*), when the screen A detects a double-tap operation of a user on the screen A, the screen A is turned on, and the screen B is turned off at the same time.

It should be understood that when both the screens of the mobile phone 100 are in the screen-off state, functional modules that are on both the screens and that are configured to detect a gesture operation may be in a working state. When wanting to perform an operation on a screen, the user may double tap the screen to turn on the screen. In this manner, a user operation is facilitated, and user experience is improved.

In some other embodiments of this application, both the screen A and the screen B of the mobile phone 100 are in the screen-off state. The screen A may detect a size and a shape of a contact surface between a finger of the user and the screen A, and the screen B may also detect a size and a shape of a contact surface between a finger of the user and the screen B. The mobile phone 100 determines to turn on the screen A or the screen B based on the size and the shape of the contact surface between the finger of the user and each of the screen A and the screen B.

In an example, both the screen A and the screen B of the mobile phone 100 are in the screen-off state. The screen A may detect a size and a shape of a contact surface between a finger of the user and the screen A. Similarly, the screen B may also detect a size and a shape of a contact surface between the finger of the user and the screen B. For example, the screen A detects that there are a larger quantity of contact regions on the screen A, and the contact regions are in an elliptic shape. The screen B detects that there are a smaller quantity of contact regions on the screen B, and the contact regions are in an elliptic shape. The mobile phone 100 may turn on the screen A. Alternatively, when the screen A detects that a total area of the contact surface between the finger of the user and the screen A is less than a first preset area and the contact surface is in an elliptic shape, and the screen B detects that a total area of the contact surface between the finger of the user and the screen B is greater than a second preset area and the contact surface is in an elliptic shape, the mobile phone 100 may turn on the screen A.

Further, the screen A may further collect a fingerprint of a finger of the user, and the screen B may also collect a fingerprint of a finger of the user.

It should be noted that the user may enroll the fingerprint in advance. For example, when the user holds the mobile phone in a manner shown in FIG. 11, the screen A collects a thumb fingerprint of the user. The screen B collects one or more of an index finger fingerprint, a middle finger fingerprint, a ring finger fingerprint, and a palm fingerprint of the user. The mobile phone 100 stores the fingerprints collected by the screen A and the screen B for use. When storing the fingerprints, the mobile phone 100 may store the fingerprints in a correspondence manner. For example, a fingerprint corresponding to the screen A is the thumb fingerprint, and a fingerprint corresponding to the screen B includes one or more of the index finger fingerprint, the middle finger fingerprint, the ring finger fingerprint, and the palm fingerprint.

Optionally, when being used (activated) for the first time, the mobile phone 100 may prompt the user to enroll a fingerprint. Alternatively, in a process of using the mobile phone 100, the user enrolls a fingerprint based on a requirement of the user. For example, the mobile phone 100 has a switch control used to enable a fingerprint enrollment function, and the fingerprint is enrolled when the user taps the switch control. The fingerprint stored in the mobile phone 100 may be updated.

FIG. 11 is still used as an example. It is assumed that both the screen A and the screen B are in the screen-off state. In a first possible implementation, when the mobile phone 100 determines that a fingerprint collected by the screen A is the thumb fingerprint, the mobile phone 100 turns on the screen A. In this case, the screen B does not need to detect a fingerprint, to reduce power consumption.

The mobile phone 100 may determine, in a plurality of manners, that the fingerprint collected by the screen A is the thumb fingerprint. For example, the screen A may send a collected fingerprint to a processor after collecting the fingerprint, and the processor compares the collected fingerprint with the stored fingerprint (the thumb fingerprint) corresponding to the screen A. If the collected fingerprint is the same as the stored fingerprint (the thumb fingerprint) corresponding to the screen A, the processor determines that the fingerprint collected by the screen A is the thumb fingerprint. Certainly, after collecting a fingerprint, the screen A may also compare the collected fingerprint with the stored fingerprint. A manner used for the screen B is similar. Details are not described again.

In a second possible implementation, the mobile phone 100 turns on the screen A when the mobile phone 100 determines that a fingerprint collected by the screen B includes the index finger fingerprint, the middle finger fingerprint, the ring finger fingerprint, or the palm fingerprint. In this case, the screen A does not need to detect a fingerprint, to reduce power consumption.

In a third possible implementation, the mobile phone 100 turns on the screen A when the mobile phone 100 determines that a fingerprint of the user collected by the screen A is the thumb fingerprint and that a fingerprint collected by the screen B includes the index finger fingerprint, the middle finger fingerprint, the ring finger fingerprint, or the palm fingerprint.

FIG. 10(*a*) and FIG. 10(*b*) are still used as an example. It is assumed that the screen A is in a screen-on state, and the screen B is in the screen-off state. In this case, the mobile phone 100 may also turn on the screen A by using one of the foregoing three implementations.

For example, the screen A is used as an example. The screen A may include at least two layers, where one layer is a display layer, and the other layer is a touch layer. When the screen A is in the screen-off state, the display layer of the screen A is in a disabled state, and the touch layer is in a working state. The touch layer may be configured to detect a size and a shape of a contact surface between a finger of the user and the screen A, or may be configured to collect a fingerprint. Certainly, a fingerprint collection function of the screen A may also be performed by another layer (when the screen A is in the screen-off state, the layer is in a working state to collect a fingerprint). This is not limited in this embodiment of this application.

For example, FIG. 11 is a schematic diagram of a graphical user interface of a mobile phone according to an embodiment of this application.

As shown in FIG. 11, the screen A of the mobile phone 100 is in a screen-off state. When the user holds the mobile phone 100, the screen A detects that a contact area between a finger of the user and the screen A is relatively small, a shape of a contact surface is an ellipse, and a fingerprint collected by the screen A is a thumb fingerprint. In this case, the mobile phone 100 determines that the screen A faces the user, and the mobile phone 100 turns on the screen A. For example, in FIG. 11, the screen B of the mobile phone 100 may be in a screen-off state, or may be in a screen-on state.

In some other embodiments of this application, both the screen A and the screen B of the mobile phone 100 are in the screen-off state. When detecting that the user taps a power button, the mobile phone 100 may determine, in the foregoing manners, which screen is to be turned on. For example, a touch layer on the screen A or the screen B is used to detect a fingerprint. In this manner, the mobile phone 100 may first disable a function module that is on the touch layer on the screen A or the screen B and that is configured to detect a fingerprint. When detecting that the user taps the power button, the mobile phone 100 enables the function module that is on the touch layer on the screen A or the screen B and that is configured to detect the fingerprint.

In some other embodiments of this application, both the screen A and the screen B of the mobile phone 100 are in the screen-off state. The mobile phone 100 determines, in the foregoing manners, which screen needs to be turned on (but does not turn on the screen A in this case), and then turns on the screen A after the mobile phone 100 detects that the user taps the power button.

Implementations of this application may be randomly combined to achieve different technical effects.

In the foregoing embodiments provided in this application, the method provided in the embodiments of this application is described from a perspective of the mobile phone 100 serving as an execution body. To implement functions in the method provided in the embodiments of this application, a terminal device may include a hardware structure and/or a software module, and implement the functions in a form of the hardware structure, the software module, or a combination of the hardware structure and the software module. Whether one of the foregoing functions is performed by using the hardware structure, the software module, or the combination of the hardware structure and the software module depends on a specific application and a design constraint condition of the technical solution.

With reference to the foregoing embodiments and the accompanying drawings, an embodiment of this application provides an electronic device operation method. The method may be implemented in an electronic device having a hardware structure shown in FIG. 1 or FIG. 3(a) and FIG. 3(b). Specifically, the electronic device includes a first touchscreen and a second touchscreen. The first touchscreen and an earpiece are located on a first surface of the electronic device, the second touchscreen is located on a second surface of the electronic device, and the first surface is different from the second surface. As shown in FIG. 12, the electronic device operation method provided in this embodiment of this application includes the following steps.

Step 1201: Display a first screen on the second touchscreen in response to receiving an incoming call, where an incoming call number, a first control, and a second control are displayed on the first screen, and when the first control is triggered, the electronic device establishes a call with an electronic device corresponding to the incoming call number, or when the second control is triggered, the electronic device refuses to establish a call with the electronic device corresponding to the incoming call number.

Step 1202: Display prompt information on the second touchscreen, where the prompt information is used to prompt a user to answer the incoming call by using the earpiece on the first surface.

For example, the electronic device is a mobile phone. An earpiece of the mobile phone is disposed on a front side, a screen is disposed on the front side of the mobile phone, and another screen is disposed on a rear side of the mobile phone. When the user performs an operation on the screen on the rear side, if the mobile phone receives an incoming call, the mobile phone may prompt the user to perform an operation on the front side. This helps improve user experience.

Figure 13:
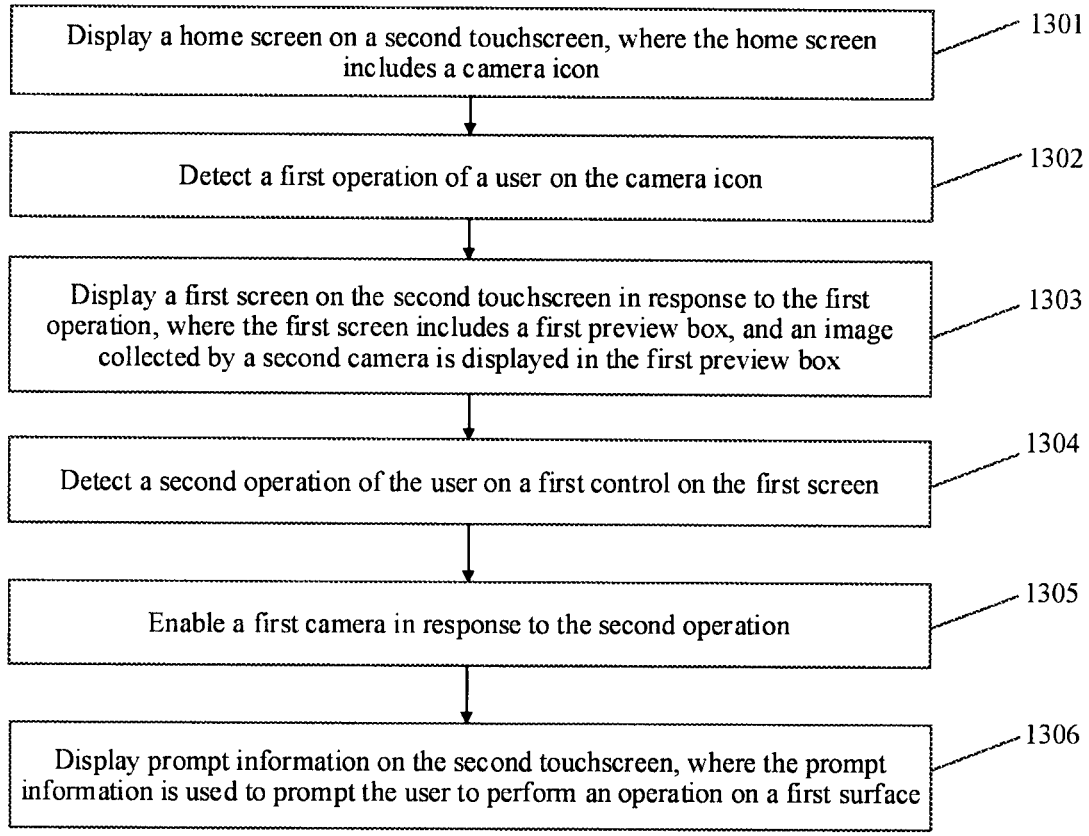
FIG. 13 is a schematic flowchart of another electronic device operation method according to an embodiment of the present invention.

With reference to the foregoing embodiments and the accompanying drawings, an embodiment of this application provides an electronic device operation method. The method may be implemented in an electronic device having a hardware structure shown in FIG. 1 or FIG. 3(a) and FIG. 3(b). Specifically, the electronic device includes a first touchscreen, a second touchscreen, a first camera, and a second camera. The first touchscreen and the first camera are located on a first surface of the electronic device, the second camera and the second touchscreen are located on a second surface of the electronic device, and the first surface is different from the second surface. As shown in FIG. 13, the electronic device operation method provided in this embodiment of this application includes the following steps.

Step 1301: Display a home screen on the second touchscreen, where the home screen includes a camera icon.

Step 1302: Detect a first operation of a user on the camera icon.

Step 1303: Display a first screen on the second touchscreen in response to the first operation, where the first screen includes a first preview box, and an image collected by a second camera is displayed in the first preview box.

Step 1304: Detect a second operation of the user on a first control on the first screen.

Step 1305: Enable the first camera in response to the second operation.

Step 1306: Display prompt information on the second touchscreen, where the prompt information is used to prompt the user to perform an operation on the first surface.

For example, the electronic device is a mobile phone. An earpiece of the mobile phone is disposed on a front side, a screen is disposed on the front side of the mobile phone, and another screen is disposed on a rear side of the mobile phone. When the user performs an operation on the screen on the rear side, if the mobile phone receives an incoming call, the mobile phone may prompt the user to perform an operation on the front side. This helps improve user experience.

Figure 14:
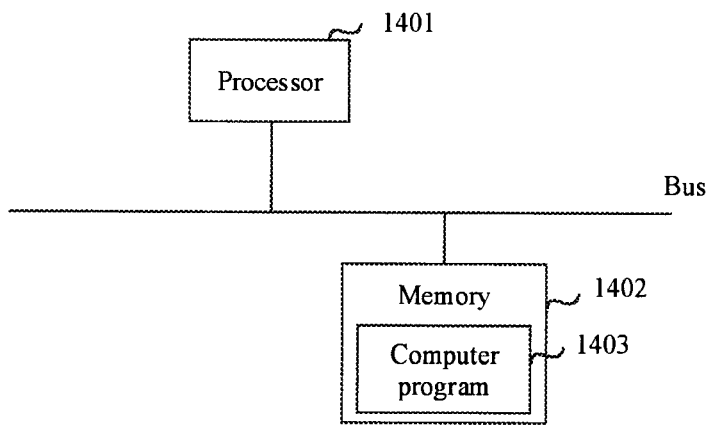
FIG. 14 is a schematic structural diagram of an electronic device according to an embodiment of the present invention.

Based on a same concept, FIG. 14 shows an electronic device 1400 according to this application. As shown in FIG. 14, the electronic device 1400 may include one or more processors 1401, a memory 1402, and one or more computer programs 1403. The foregoing components may be connected by using one or more communications buses. The one or more computer programs 1403 are stored in the memory 1402 and are configured to be executed by the one or more processors 1401. The one or more computer programs 1403 include an instruction, and the instruction may enable the electronic device to perform the steps in FIG. 12 or FIG. 13 and corresponding embodiments.

An embodiment of this application further provides a computer storage medium. The storage medium may include a memory. The memory may store a program. When the program is executed, an electronic device is enabled to perform all the steps described in the method embodiment shown in FIG. 12 or FIG. 13.

An embodiment of this application further provides a computer program product. When the computer program product runs on an electronic device, the electronic device is enabled to perform all the steps described in the method embodiment shown in FIG. 12 or FIG. 13.

With descriptions of the foregoing embodiments, a person skilled in the art may clearly understand that the embodiments of this application may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. This is used as an example but is not limited to: The computer-readable medium may include a RAM, a ROM, an electrically erasable programmable read-only memory (electrically erasable programmable read only memory, EEPROM), a compact disc read-only memory (compact disc read-Only memory, CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (digital subscriber line, DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (disk) and disc (disc) used by the embodiments of this application includes a compact disc (compact disc, CD), a laser disc, an optical disc, a digital video disc (digital video disc, DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely embodiments of this application, but is not intended to limit the protection scope of this application. Any modification, equivalent replacement, or improvement made according to the disclosure of this application shall fall within the protection scope of this application.

What is claimed is:

1. An electronic device operation method implemented by an electronic device, wherein the electronic device operation method comprises:
    receiving an incoming call when a first touchscreen of the electronic device is in a screen-off state and a second touchscreen of the electronic device is in a screen-on state, wherein the first touchscreen and an earpiece are located on a first surface of the electronic device, wherein the second touchscreen is located on a second surface of the electronic device, and wherein no earpiece is disposed on the second surface;
    displaying, by the second touchscreen, while the first touchscreen remains in the screen-off state, and in response to receiving the incoming call, a first incoming call interface, wherein the first incoming call interface comprises a call number, a first control, a second control, and prompt information, wherein the first control is an answer control, wherein the second control is a reject control, and wherein the prompt information prompts to answer the incoming call by using the earpiece;
    detecting that the electronic device changes a state;
    displaying, by the first touchscreen, while the second touchscreen is in the screen-off state, and in response to detecting that the electronic device changes the state, a second incoming call interface, wherein the second incoming call interface comprises an incoming call number, the first control, and the second control;
    detecting, on the second incoming call interface, a first operation of the first control; and
    displaying, by the first touchscreen and in response to the first operation, a call interface,
    wherein the call interface comprises the incoming call number.

2. The electronic device operation method of claim 1, wherein the call interface further comprises a speaker control, a dial pad control, a mute control, an address book control, or a video call control.

3. The electronic device operation method of claim 1, wherein after receiving the incoming call, the electronic device operation method further comprises:
    detecting a second operation performed on a power button of the electronic device; and
    rejecting, in response to the second operation, the incoming call.

4. An electronic device comprising:
    a first surface comprising:
        an earpiece located on the first surface; and
        a first touchscreen located on the first surface;
    a second surface comprising a second touchscreen located on the second surface; and
    a memory configured to store instructions; and
    one or more processors coupled to the memory and configured to execute the instructions to:
        receive an incoming call when the first touchscreen is in a screen-off state and the second touchscreen is in a screen-on state;
        display, by the second touchscreen, while the first touchscreen remains in the screen-off state, and in response to receiving the incoming call, a first incoming call interface, wherein the first incoming call interface comprises a call number, a first control, a second control, and prompt information, wherein the first control is an answer control, wherein the second control is a reject control, and wherein the prompt information prompts to answer the incoming call by using the earpiece;
        detect that the electronic device changes a state;
        display, by the first touchscreen, while the second touchscreen is in the screen-off state, and in response to detecting that the electronic device changes the state, a second incoming call interface, wherein the second incoming call interface comprises an incoming call number, the first control, and the second control;
        detect, on the second incoming call interface, a first operation of the first control; and
        display, by the first touchscreen and in response to the first operation, a call interface,
        wherein the call interface comprises the incoming call number.

5. The electronic device of claim 4, wherein the call interface further comprises a speaker control, a dial pad control, a mute control, an address book control, or a video call control.

6. The electronic device of claim 5, wherein the electronic device is a folding screen electronic device.

7. The electronic device of claim 4, further comprising a power button coupled to the one or more processors, wherein after receiving the incoming call, wherein the one or more processors are further configured to execute the instructions to:
    detect an operation performed on the power button; and
    reject, in response to the operation, the incoming call.

8. The electronic device of claim 4, wherein the electronic device is a folding screen electronic device.

9. A computer program product comprising instructions stored on a non-transitory computer-readable medium that, when executed by one or more processors, cause an electronic device to:
    receive an incoming call when a first touchscreen of the electronic device is in a screen-off state and a second touchscreen of the electronic device is in a screen-on state, wherein the first touchscreen and an earpiece are located on a first surface of the electronic device, wherein the second touchscreen is located on a second surface of the electronic device, and wherein no earpiece is disposed on the second surface;
    display, by the second touchscreen, while the first touchscreen remains in the screen-off state, and in response to receiving the incoming call, a first incoming call interface, wherein the first incoming call interface comprises a call number, a first control, a second control, and prompt information, wherein the first control is an answer control, wherein the second control is a reject control, wherein the prompt information prompts to answer the incoming call by using the earpiece, and wherein the first touchscreen is in the screen-off state when the second touchscreen displays the first incoming call interface;
    detect that the electronic device changes a state;
    display, by the first touchscreen, while the second touchscreen is in the screen-off state, and in response to detecting that the electronic device changes the state, a second incoming call interface, wherein the second incoming call interface comprises an incoming call number, the first control, and the second control;
    detect, on the second incoming call interface, a first operation of the first control; and
    display, by the first touchscreen and in response to the first operation, a call interface,
    wherein the call interface comprises the incoming call number.

10. The computer program product of claim 9, wherein the call interface further comprises a speaker control.

11. The computer program product of claim 9, wherein the call interface further comprises a dial pad control.

12. The computer program product of claim 9, wherein the call interface further comprises a mute control.

13. The computer program product of claim 9, wherein the call interface further comprises an address book control.

14. The computer program product of claim 9, wherein the call interface further comprises a video call control.

15. The computer program product of claim 9, wherein after receiving the incoming call, the one or more processors are further configured to execute the instructions to:
    detect a second operation performed on a power button of the electronic device; and
    reject, in response to the second operation, the incoming call.

16. The computer program product of claim 9, wherein the electronic device is a folding screen electronic device.

17. The computer program product of claim 9, wherein the one or more processors are further configured to: detect that a user triggers the answer control; and
    display, by the second touchscreen and in response to detecting that the user triggers the answer control, a prompt box.

18. The computer program product of claim 17, wherein the one or more processors are further configured to display text information in the prompt box, and wherein the text information indicates a location of the earpiece.

19. The computer program product of claim 9, wherein the one or more processors are further configured to detect that a user triggers the reject control.

20. The computer program product of claim 19, wherein the one or more processors are further configured to not display, by the second touchscreen and in response to detecting that the user triggers the reject control, a prompt box.

* * * * *